United States Patent
Neil et al.

(10) Patent No.: US 7,533,114 B2
(45) Date of Patent: May 12, 2009

(54) MOBILE DEVICE HAVING EXTENSIBLE SOFTWARE FOR PRESENTING SERVER-SIDE APPLICATIONS, SOFTWARE AND METHODS

(75) Inventors: Tim Neil, Mississauga (CA); Scott Neil, Toronto (CA); Andrew Allen, LaSalle (CA)

(73) Assignee: Nextair Corporation, Waterloo, Ontario (CA)

( * ) Notice: Subject to any disclaimer, the term of this patent is extended or adjusted under 35 U.S.C. 154(b) by 514 days.

(21) Appl. No.: 10/537,428

(22) PCT Filed: Feb. 22, 2005

(86) PCT No.: PCT/CA2005/000238

§ 371 (c)(1),
(2), (4) Date: Jun. 2, 2005

(87) PCT Pub. No.: WO2006/089391

PCT Pub. Date: Aug. 31, 2006

(65) Prior Publication Data

US 2006/0190813 A1    Aug. 24, 2006

(51) Int. Cl.
*G06F 17/30* (2006.01)
(52) U.S. Cl. .............. 707/102; 707/3; 707/10; 707/104.1; 455/414.1; 717/116
(58) Field of Classification Search .......... None
See application file for complete search history.

(56) References Cited

U.S. PATENT DOCUMENTS

| | | | |
|---|---|---|---|
| 6,067,582 A | 5/2000 | Smith et al. | |
| 6,304,898 B1 | 10/2001 | Shiigi | |
| 6,347,398 B1 | 2/2002 | Parthasarathy et al. | |
| 6,418,310 B1 | 7/2002 | Dent | |
| 6,438,575 B1 | 8/2002 | Khan et al. | |
| 6,496,979 B1 | 12/2002 | Chen et al. | |
| 6,559,773 B1 | 5/2003 | Berry | |
| 6,590,589 B1 | 7/2003 | Sluiman et al. | |
| 6,609,150 B2 | 8/2003 | Lee et al. | |
| 6,628,107 B1 | 9/2003 | La Rosa et al. | |
| 6,629,284 B1 | 9/2003 | Leermakers | |
| 6,701,521 B1 | 3/2004 | McLlroy et al. | |
| 6,721,779 B1 | 4/2004 | Maffeis | |

(Continued)

FOREIGN PATENT DOCUMENTS

JP    2001-306308    11/2001

(Continued)

OTHER PUBLICATIONS

English translation of Abstract of JP 2001-306308, David Holy, "Method For Defining Class of Data Center Application", Nov. 2, 2001, esp@cenet database—Patent Abstracts of Japan.

*Primary Examiner*—Debbie M Le

(57) ABSTRACT

Data from an application executing at a computing device is presented at a remote wireless device, by providing the device an application definition file, containing a definition of a user interface for the application at the mobile device. Based on the definition file, the wireless device may receive data from the application and present an interface for the application. Virtual machine software at the mobile device interprets the application definition file. This virtual machine software is extensible to take advantage of other software and/or hardware at the device.

25 Claims, 85 Drawing Sheets

U.S. PATENT DOCUMENTS

| | | |
|---|---|---|
| 7,051,080 B1 * | 5/2006 | Paul et al. ................... 709/217 |
| 7,191,211 B2 * | 3/2007 | Tuli ........................... 709/203 |
| 2001/0012281 A1 | 8/2001 | Hall et al. |
| 2001/0044321 A1 | 11/2001 | Ausems et al. |
| 2002/0026447 A1 | 2/2002 | Matsutuka et al. |
| 2002/0112078 A1 * | 8/2002 | Yach .......................... 709/246 |
| 2002/0116698 A1 | 8/2002 | Lurie et al. |
| 2002/0181060 A1 | 12/2002 | Huang |
| 2002/0198931 A1 | 12/2002 | Murren et al. |
| 2003/0060896 A9 | 3/2003 | Hulai et al. |
| 2003/0084202 A1 | 5/2003 | Hideya |
| 2003/0105845 A1 | 6/2003 | Leermakers |
| 2003/0187952 A1 | 10/2003 | Young et al. |
| 2003/0217086 A1 | 11/2003 | Kushnirskiy et al. |
| 2004/0117439 A1 | 6/2004 | Levett et al. |
| 2004/0117799 A1 | 6/2004 | Brockway et al. |
| 2005/0014494 A1 * | 1/2005 | Owen et al. ................. 455/419 |

FOREIGN PATENT DOCUMENTS

| | | |
|---|---|---|
| WO | WO 01/48630 A2 | 7/2001 |
| WO | WO 01/50712 | 7/2001 |
| WO | WO 01/77822 A2 | 10/2001 |

* cited by examiner

```
72 ⎧ <ARML>
   ⎪         <HEAD>_</HEAD>
   ⎪         <SYS>
   ⎨               <QUERY>
   ⎪                     <PLATFORMS>
   ⎪                             <PLATFORM>WinCE</PLATFORM>
   ⎪                     </PLATFORMS>
   ⎪               </REG>
   ⎪         </SYS>
   ⎩ </ARML>

74 ⎧ <ARML>
   ⎪         <HEAD>_</HEAD>
   ⎪         <SYS>
   ⎨               <QUERYRESP>
   ⎪                     <APP>Order Entry</APP>
   ⎪                     <APP>Helpdesk</APP>
   ⎪                     <APP>Engineer Dispatch</APP>
   ⎪               </QUERYRESP>
   ⎪         </SYS>
   ⎩ </ARML>

76 ⎧ <ARML>
   ⎪         <HEAD>_</HEAD>
   ⎪         <SYS>
   ⎪               <REG TYPE="ADD">
   ⎨                     <CLIENTID>SUNTRESS</CLIENTID>
   ⎪                     <MOBILEID>867452</MOBILEID>
   ⎪                     <NEWMOBILEID>268625</NEWMOBILEID>
   ⎪                     <PLATFORMS>
   ⎪                             <PLATFORM>WinCE</PLATFORM>
   ⎪                     </PLATFORMS>
   ⎪               </REG>
   ⎪         </SYS>
   ⎩ </ARML>

76 ⎧ <ARML>
   ⎪         <HEAD>_</HEAD>
   ⎪         <SYS>
   ⎪               <REGCONFIRM TYPE="ADD">
   ⎪                     <MOBILEID>268625</MOBILEID>
   ⎪                     <VALUE>CONFIRM</VALUE>
   ⎪                     <INTERFACE>
   ⎪                           <BUTTONS NUM="1">
   ⎨                                 <BTN NAME="OK" CAPTION="Send" INDEX="0">
   ⎪                                 </BTN>
   ⎪                           </BUTTONS>
   ⎪                           <EDITBOXES NUM="3">
   ⎪                                 <E3 NAME="To" INDEX="1"></E3>
   ⎪                                 <E3 NAME="Subject" INDEX="2"></E3>
   ⎪                                 <E3 NAME="Body" INDEX="3"></E3>
   ⎪                           </EDITBOXES>
   ⎪                     </INTERFACE>
   ⎪               </REGCONFIRM>
   ⎪         </SYS>
   ⎩ </ARML>
```

FIG. 12

```
<AXSCHDEF APPNAME="SignatureCapture" VERSION="1.2" DESC="Signature
    Capture - Integration" ARMLMAJOR="3" ARMLMINOR="1">
<AXTDEFS>
<TDEF NAME="LASTSIG" PK="SIGNATURE" DELINDEX="0">
<FIELDS>
<FLD TYPE="MEMO" SIZE="1" INDEXED="NO"
    ALLOWNULL="NO">SIGNATURE</FLD>
<FLD TYPE="STRING" SIZE="20" INDEXED="NO"
    ALLOWNULL="NO">SIGNAME</FLD>
    </FIELDS>
    </TDEF>
</AXTDEFS>
```

FIG. 14

```
<DPACKETS>
<AXDATAPACKET BODY="SIG" UPDATELOCALDATA="NO" SENDTOAPP="YES">
<TABLEUPDATES>
<TUPDATE TABLE="LASTSIG" UPDATETYPE="DELETE" WHEREFIELD=""
    WHEREPARAM="" SECTION="SIG" MULTIROW="NO" MULTIROWIDENT="" />
<TUPDATE TABLE="LASTSIG" UPDATETYPE="ADD" WHEREFIELD=""
    WHEREPARAM="" SECTION="SIG" MULTIROW="NO" MULTIROWIDENT="">
<PKGFIELDS>
<PKGFLD NAME="SIGNATURE" PARAMTYPE="VALUE" />
<PKGFLD NAME="SIGNAME" PARAMTYPE="PROP">NAME</PKGFLD>
    </PKGFIELDS>
    </TUPDATE>
    </TABLEUPDATES>
    </AXDATAPACKET>
    </DPACKETS>
<DEVICES>
<DEV TYPE="CE">
```

FIG. 15

```
---------------------------------------------------------------------------------
- <SCREENS STSCRN="MAIN">
- <SCREEN NAME="MAIN" TITLE="Signature Capture Demo"
    ORDERED="FALSE">
  <EVENTS />
- <BUTTONS>
- <BTN NAME="btnCapture" INDEX="0" CAPTION="Capture New Signature"
    X="28" Y="16" HT="21" WT="180" READONLY="NO">
- <EVENTS>
- <EVENT TYPE="BUTTONCLICK">
  <ACTION TYPE="INTEGRATION" CLSID="AirixSignature.AirixSignatureCtrl"
    SAVENAME="SIGNATURE" SAVE="TRUE" />
    </EVENT>
    </EVENTS>
    </BTN>
- <BTN NAME="btnView" INDEX="1" CAPTION="View Last Signature" X="28"
    Y="50" HT="21" WT="180" READONLY="NO">
- <EVENTS>
- <EVENT TYPE="BUTTONCLICK">
  <ACTION TYPE="INTEGRATION" CLSID="AirixSignature.AirixSignatureCtrl"
    SAVENAME="" SAVE="FALSE">[SP.*.SIGNATURE]</ACTION>
    </EVENT>
    </EVENTS>
    </BTN>
- <BTN NAME="btnSend" INDEX="2" CAPTION="Send to Server" X="28" Y="116"
    HT="21" WT="180" READONLY="NO">
- <EVENTS>
- <EVENT TYPE="BUTTONCLICK">
- <ACTION TYPE="ARML">
- <ARMLTEXT>

```
...
- <PKG TYPE="SIG">
  <SIG NAME="Test">[SP.*.SIGNATURE]</SIG>
    </PKG>
    </ARMLTEXT>
    </ACTION>
    </EVENT>
    </EVENTS>
    </BTN>
- <BTN NAME="btnClose" INDEX="3" CAPTION="Close" X="28" Y="148" HT="21"
    WT="180" READONLY="NO">
- <EVENTS>
- <EVENT TYPE="BUTTONCLICK">
  <ACTION TYPE="CLOSE" />
    </EVENT>
    </EVENTS>
    </BTN>
    </BUTTONS>
    </SCREEN>
    </SCREENS>
    </DEV>
    </DEVICES>
    </AXSCHDEF>

Appendix "A"

Contents

| | | |
|---|---|---|
| 1 | Introduction | FIG. 17F |
| 1.1 | Purpose of document | FIG. 17F |
| 1.2 | Audience | FIG. 17F |
| 1.3 | Definitions & Acronyms | FIG. 17F |
| 2 | ARML Overview | FIG. 17G |
| 2.1 | ARML design considerations | FIG. 17G |
| 2.2 | ARML usage | FIG. 17H |
| 2.3 | The scratchpad area | FIG. 17H |
| 2.4 | System Variables and Functions | FIG. 17I |
| 2.4.1 | Variables: | FIG. 17I |
| 2.4.2 | Functions: | FIG. 17I |
| 2.5 | Single-Field Lookup | FIG. 17J |
| 3 | ARML application definition | FIG. 17K |
| 3.1 | General | FIG. 17K |
| 3.1.1 | Description | FIG. 17K |
| 3.1.2 | Structure | FIG. 17K |
| 3.1.3 | Tags | FIG. 17K |
| 3.2 | Table Definitions Section | FIG. 17M |
| 3.2.1 | Description | FIG. 17M |
| 3.2.2 | Structure | FIG. 17M |
| 3.2.3 | Tags | FIG. 17M |
| 3.2.4 | Example | FIG. 17N |
| 3.3 | Package Definitions Section | FIG. 17P |
| 3.3.1 | Description | FIG. 17P |
| 3.3.2 | Structure | FIG. 17P |
| 3.3.3 | Tags | FIG. 17P |
| 3.3.4 | Example | FIG. 17S |
| 3.4 | Device Interface Definitions Section | FIG. 17T |
| 3.4.1 | Description | FIG. 17T |
| 3.4.2 | Structure | FIG. 17T |
| 3.4.3 | Tags | FIG. 17T |
| 3.4.4 | Example | FIG. 17V |

FIG. 17A

Appendix "A"

| | | |
|---|---|---|
| 4 | Application-defined packages | FIG. 17W |
| 4.1 | General | FIG. 17W |
| 4.1.1 | Description | FIG. 17W |
| 4.1.2 | Structure | FIG. 17W |
| 4.1.3 | Tags | FIG. 17W |
| 4.2 | Package information | FIG. 17X |
| 4.2.1 | Example | FIG. 17X |
| 5 | User interface Definitions | FIG. 17Z |
| 5.1 | General | FIG. 17Z |
| 5.1.1 | Description | FIG. 17Z |
| 5.1.2 | Structure | FIG. 17Z |
| 5.1.3 | Tags | FIG. 17AA |
| 5.2 | Queries definition section | FIG. 17CC |
| 5.2.1 | Description | FIG. 17CC |
| 5.2.2 | Structure | FIG. 17CC |
| 5.2.3 | Tags | FIG. 17CC |
| 5.3 | Menu definition section | FIG. 17DD |
| 5.3.1 | Description | FIG. 17DD |
| 5.3.2 | Structure | FIG. 17DD |
| 5.3.3 | Tags | FIG. 17DD |
| 5.4 | Buttons definition section | FIG. 17FF |
| 5.4.1 | Description | FIG. 17FF |
| 5.4.2 | Structure | FIG. 17FF |
| 5.4.3 | Tags | FIG. 17FF |
| 5.5 | Text Items definition section | FIG. 17GG |
| 5.5.1 | Description | FIG. 17GG |
| 5.5.2 | Structure | FIG. 17GG |
| 5.5.3 | Tags | FIG. 17GG |
| 5.6 | Edit boxes definition section | FIG. 17HH |
| 5.6.1 | Description | FIG. 17HH |
| 5.6.2 | Structure | FIG. 17HH |
| 5.6.3 | Tags | FIG. 17II |
| 5.7 | Choice items definition section | FIG. 17JJ |
| 5.7.1 | Description | FIG. 17JJ |
| 5.7.2 | Structure | FIG. 17JJ |
| 5.7.3 | Tags | FIG. 17KK |
| 5.8 | Checkboxes definition section | FIG. 17LL |

FIG. 17B

Appendix "A"

| | | |
|---|---|---|
| 5.8.1 | Description | FIG. 17LL |
| 5.8.2 | Structure | FIG. 17LL |
| 5.8.3 | Tags | FIG. 17MM |
| 5.9 | Listboxes definition section | FIG. 17NN |
| 5.9.1 | Description | FIG. 17NN |
| 5.9.2 | Structure | FIG. 17NN |
| 5.9.3 | Tags | FIG. 17NN |
| 5.10 | Grids | FIG. 17PP |
| 5.10.1 | Description | FIG. 17PP |
| 5.10.2 | Structure | FIG. 17PP |
| 5.10.3 | Tags | FIG. 17QQ |
| 5.10.4 | Example | FIG. 17RR |
| 6 | The Smart Client event model | FIG. 17TT |
| 6.1 | The EVENTS tag | FIG. 17UU |
| 6.2 | The EVENT tag | FIG. 17UU |
| 6.2.1 | The BUTTONCLICK event | FIG. 17UU |
| 6.2.2 | The MENUITEMSELECTED event | FIG. 17UU |
| 6.2.3 | The DATA event | FIG. 17UU |
| 6.3 | The ACTION tag | FIG. 17UU |
| 6.3.1 | The OPEN action | FIG. 17VV |
| 6.3.2 | The ARML action | FIG. 17VV |
| 6.3.3 | The SAVE action | FIG. 17VV |
| 6.3.4 | The PURGE action | FIG. 17WW |
| 6.3.5 | The NOTIFY action | FIG. 17WW |
| 6.3.6 | The CLOSE action | FIG. 17WW |
| 6.3.7 | The ALERT action | FIG. 17WW |
| 6.3.8 | The INTEGRATION action | FIG. 17WW |
| 6.3.9 | The CLOSESCREEN action | FIG. 17XX |
| 6.3.10 | The REFRESH action | FIG. 17XX |
| 6.3.11 | The SAVEITEM action | FIG. 17XX |
| 6.3.12 | The IF Action | FIG. 17XX |
| Example of airix event model | | FIG. 17BBB |
| 7 | AVM-server system interactions | FIG. 17DDD |
| 7.1 | General | FIG. 17DDD |
| 7.1.1 | Description | FIG. 17DDD |
| 7.1.2 | Structure | FIG. 17DDD |
| 7.1.3 | Tags | FIG. 17DDD |

FIG. 17C

Appendix "A"

| | | |
|---|---|---|
| 7.2 | Device Registration & deregistration package | FIG. 17EEE |
| 7.2.1 | Description | FIG. 17EEE |
| 7.2.2 | Structure | FIG. 17EEE |
| 7.2.3 | Tags | FIG. 17EEE |
| 7.2.4 | Example | FIG. 17EEE |
| 7.3 | Registration confirmation package | FIG. 17FFF |
| 7.3.1 | Description | FIG. 17FFF |
| 7.3.2 | Structure | FIG. 17FFF |
| 7.3.3 | Tags | FIG. 17FFF |
| 7.3.4 | Example | FIG. 17GGG |
| 7.4 | Find applications package | FIG. 17HHH |
| 7.4.1 | Description | FIG. 17HHH |
| 7.4.2 | Structure | FIG. 17HHH |
| 7.4.3 | Tags | FIG. 17HHH |
| 7.5 | Find applications confirmation package | FIG. 17III |
| 7.5.1 | Description | FIG. 17III |
| 7.5.2 | Structure | FIG. 17III |
| 7.5.3 | Tags | FIG. 17III |
| 7.6 | Application Registration & deregistration package | FIG. 17JJJ |
| 7.6.1 | Description | FIG. 17JJJ |
| 7.6.2 | Structure | FIG. 17JJJ |
| 7.6.3 | Tags | FIG. 17JJJ |
| 7.7 | Application registration & deregistration confirmation package | FIG. 17KKK |
| 7.7.1 | Description | FIG. 17KKK |
| 7.7.2 | Structure | FIG. 17KKK |
| 7.7.3 | Tags | FIG. 17KKK |
| 7.7.4 | Example | FIG. 17LLL |
| 7.8 | Setting the active device package | FIG. 17MMM |
| 7.8.1 | Description | FIG. 17MMM |
| 7.8.2 | Structure | FIG. 17MMM |
| 7.8.3 | Tags | FIG. 17MMM |
| 7.8.4 | Example | FIG. 17MMM |
| 7.9 | Set active device response | FIG. 17MMM |
| 7.9.1 | Description | FIG. 17MMM |
| 7.9.2 | Structure | FIG. 17MMM |
| 7.9.3 | Tags | FIG. 17NNN |
| 7.9.4 | Example | FIG. 17NNN |

FIG. 17D

Appendix "A"

| | | |
|---|---|---|
| 7.10 | Invalid Application package | FIG. 17NNN |
| 7.10.1 | Description | FIG. 17NNN |
| 7.10.2 | Structure | FIG. 17NNN |
| 7.10.3 | Tags | FIG. 17OOO |
| 7.10.4 | Example | FIG. 17OOO |
| 8 | Application-server system interactions | FIG. 17PPP |

FIG. 17E

Appendix "A"

1 Introduction

1.1 Purpose of document
This document describes the structure and syntax of the ARML language.

1.2 Audience
The document is intended to be read by AIRIX developers and users of ARML.

1.3 Definitions & Acronyms

| | |
|---|---|
| ARML | AIRIX Markup Language |
| XML | Extensible Markup Language |

FIG. 17F

Appendix "A"

2 ARML Overview

ARML is an XML markup language used by the AIRIX platform. It performs three tasks;

- Data is passed back and forth between the mobile server, AIRIX platform and enterprise application using ARML.
- The AIRIX Smart Client uses ARML to define the user interface for an AIRIX-enabled application on the mobile device
- The AIRIX server uses ARML to define that data that it stores for the application in its database.

2.1 ARML design considerations

ARML has been designed with the following goals in mind;

- Transactions and screen definitions should be as independent as possible
- AIRIX should be unaware of internals of the enterprise application
- Strict conformance to the XML specification will be enforced
- Operation should be transparent to the end user
- ARML packages should be readable as is
- The minimum number of characters needed should be used

FIG. 17G

Appendix "A"

2.2 ARML usage

The diagram below illustrates how ARML is used.

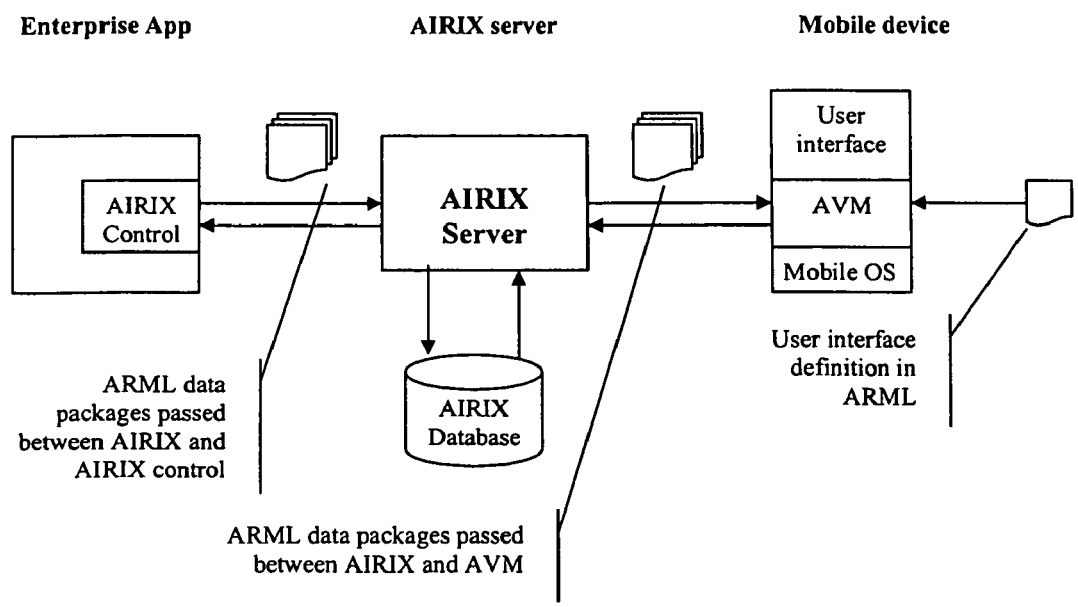

Figure 1 -The ARML environment

The key to ARML usage is the application definition file held on the AIRIX server. This file defines the AIRIX tables for the application, the allowed message set and the user interface definitions for the application on a given device.

2.3 The scratchpad area

The scratchpad is used as a temporary storage area where a global value or a value associated to a screen can be saved for future use. The syntax for a scratchpad value is as follows:

screen scratchpad value: [SP.*screen.savename*]

FIG. 17H

Appendix "A"

global scratchpad value: [SP.*.savename]

The syntax for retrieving a global scratchpad value can also be used to retrieve screen scratchpad values.

2.4 System Variables and Functions
There are several variables that are available that will retrieve application and system values to be used throughout the application. The syntax for these variables are as follows:

2.4.1 Variables:
[DATE] – returns the current system date, formatted as dd mmm yy
[TIME] – returns the current system time, formatted as hh:mm:ss am/pm.
[SYS.VAR.DATE] - returns the current system date, formatted as dd mmm yy
[SYS.VAR.MOBILEID] - retrieves the device's Mobile ID
[SYS.VAR.APPNAME] - retrieves the name of the application.
[SYS.VAR.APPVERSION] - retrieves the version number of the application.
[SYS.VAR.SCVERSION] - retrieves the version number of the Smart Client.
[SYS.VAR.ARMLMAJOR] - retrieves the ARML major version of the application.
[SYS.VAR.ARMLMINOR] - retrieves the ARML minor version of the application.

2.4.2 Functions:
[SYS.FUNC.DATEADD([SYS.VAR.DATE],+-x)] - The Date Arithmetic tag is used to add or subtract days from the current date. In the tag, x represents the number of days added or subtracted. Developers can also choose to substitute a hard-coded date value in the Date Arithmetic tag, in the place of the [SYS.VAR.DATE] tag.

[SYS.FUNC.DATETOSTR([SYS.VAR.DATE],d mmm yyyy h:nn:ss tz)] - The Date To String tag is used to convert date data to a string value.

[SYS.FUNC.STRTODATE([SYS.VAR.DATE],d mmm yyyy h:nn:ss tz)] - The String to Date tag is used to convert string data to a date value, in the RFC 1123 format.

FIG. 17I

Appendix "A"

2.5 Single-Field Lookup

The single-field lookup will run a simple SELECT query with one where clause to retrieve specific data. The syntax is as follows:

[DB.DOLOOKUP(*table, field, wherefield, wherevalue*)]

FIG. 17J

Appendix "A"

3 ARML application definition

3.1 General

3.1.1 Description
The application definition section defines the AIRIX tables and ARML data packages that are used for transactions involved with a specific application.

3.1.2 Structure
The ARML application definition has the following structure;

```
<ARML>
    <AXSCHDEF>
            <EVENTS>
                    <EVENT>
                            (action definitions)
                    </EVENT>
            </EVENTS>
            <AXTDEFS>
                    (table definitions)
            </AXTDEFS>
            <DPACKETS>
                    (data package definitions)
            </DPACKETS>
            <DEVICES>
                    (device interface definitions)
            </DEVICES>
    </AXSCHDEF>
</ARML>
```

3.1.3 Tags

3.1.3.1 The <AXSCHDEF> tag
These tags (<AXSCHDEF>...</AXSCHDEF>) mark the start and end of the application definition. THE AXSCHDEF tag has two attributes;

| Attribute | Optional? | Description |
| --- | --- | --- |
| APPNAME | No | The name of the application |
| VERSION | No | Which version of the application the file describes |
| DESC | No | A text description of the application for display purposes |
| ARMLMAJOR | No | The major version of the ARML language this application definition was created with. |

FIG. 17K

Appendix "A"

| ARMLMINOR | No | The minor version of the ARML language this application definition was created with. |

3.1.3.2 The <EVENTS> tag

The <EVENT>...</EVENT> pair marks the start and end of a user-interface level event definition. See section 6 for a detailed discussion of the Smart Client event model.

3.1.3.3 The <EVENT> tag

The <EVENT>...</EVENT> pair marks the start and end of a user-interface level event definition. See section 6 for a detailed discussion of the Smart Client event model.

3.1.3.4 The <AXTDEFS> tag

The <AXTDEFS>...</AXTDEFS> pair marks the start and end of the table definitions section. It has no attributes.

3.1.3.5 The <DPACKETS> tag

The <DPACKETS>...</DPACKETS> pair marks the start and end of the data package definitions section. It has no attributes.

3.1.3.6 The <DEVICES> tag

The <DEVICES>...</DEVICES> pair marks the start and end of the device interface definitions section. It has no attributes.

FIG. 17L

Appendix "A"

3.2 Table Definitions Section

3.2.1 Description
The table definitions section defines the tables on the mobile device for the application

3.2.2 Structure
The table definitions section has the following structure;

```
{wrapper tags}
<TDEF>
      <FIELDS>
            <FLD>...</FLD>
      <FIELDS>
</TDEF>
 (etc.).
{wrapper tags}
```

3.2.3 Tags

3.2.3.1 The <TDEF> tag
Each table definition is enclosed within the <TDEF>...</TDEF> pair. The TDEF tag has the following attributes;

| Attribute | Optional? | Description |
|---|---|---|
| NAME | No | The number of table definitions in the section |
| PK | No | Which of the table fields is the primary key for the table |
| DELINDEX | No | The index of this table with respect to all the tables for specifying the delete order. This value is 1 based. |

3.2.3.2 The <FIELDS> tag
The <FIELDS>...</FIELDS> tag pair marks where the fields in a given table are defined. The FIELDS tag has a no attributes.

3.2.3.3 The <FLD> tag
The <FLD>...</FLD> tag pair defines a single field in a table. Enclosed between the tags is the field name. The <FLD> tag has the following structure;

| Attribute | Optional? | Description |
|---|---|---|
| TYPE | No | The data type contained in the field. Permitted values are: |

FIG. 17M

Appendix "A"

| | | INT – integer value<br>STRING – a fixed-length string of n characters (see SIZE field)<br>MEMO – a string of max 65535 characters<br>AUTOINC – an integer value, automatically incremented by the database. This field will be read-only to the applications.<br>DATETIME – a datetime value |
|---|---|---|
| SIZE | No | If the TYPE is set to STRING, this field specifies the number of characters in the field |
| INDEXED | No | Specifies if the field needs to be indexed in the AIRIX database |
| REFERENCEFIELD | Yes | If this attribute is present, it defines that this field is a foreign key. The foreign table/field is given in the format "table(field)" |
| ALLOWNULL | No | Specifies if the field is allowed to have a null value |

3.2.4 Example

An email application would use 2 tables for storing sent emails.

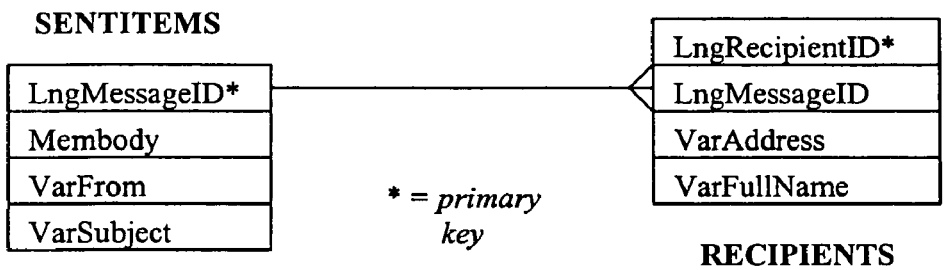

Figure 2 - sample email schema

This translates into the following ARML fragment;

```
<TDEF NAME="SENTITEMS" UPDATETYPE=NEW PK=LNGMESSAGEID DELINDEX=2>
    <FIELDS>
        <FLD TYPE="INT" SIZE="0" INDEXED="NO" REFERENCEFIELD=""
            ALLOWNULL="NO" >LNGMESSAGEID</FLD>
        <FLD TYPE="STRING" SIZE="200" INDEXED="NO" REFERENCEFIELD=""
            ALLOWNULL="YES" >VARFROM</FLD>
        <FLD TYPE="MEMO" SIZE="0" INDEXED="NO" REFERENCEFIELD=""
            ALLOWNULL="YES" >MEMBODY</FLD>
        <FLD TYPE="STRING" SIZE="200" INDEXED="NO" REFERENCEFIELD=""
            ALLOWNULL="YES" >VARSUBJECT</FLD>
    </FIELDS>
</TDEF>
<TDEF NAME="RECIPIENTS" UPDATETYPE=NEW PK=LNGRECIPIENTID DELINDEX=1>
    <FIELDS>
        <FLD TYPE="INT" SIZE="AUTOINC" INDEXED="NO" REFERENCEFIELD=""
            ALLOWNULL="NO" >LNGMESSAGEID</FLD>
```

FIG. 17N

Appendix "A"

```
<FLD TYPE="INT" SIZE="0" INDEXED="YES"
     REFERENCEFIELD="SENTITEMS(MESSAGEID)"
     ALLOWNULL="NO">LNGMESSAGEID</FLD>
<FLD TYPE="STRING" SIZE="200" INDEXED="NO" REFERENCEFIELD=""
     ALLOWNULL="YES">VARFULLNAME</FLD>
<FLD TYPE="STRING" SIZE="200" INDEXED="NO" REFERENCEFIELD=""
     ALLOWNULL="YES">VARADDRESS</FLD>
  </FIELDS>
</TDEF>
```

Figure 3 - a sample table definition section

FIG. 17O

Appendix "A"

3.3 Package Definitions Section

3.3.1 Description
The package definitions section defines the structure of the application packages and the data that they carry.

3.3.2 Structure
The package definitions section has the following structure;

```
{wrapper tags}
<AXDATAPACKET>
    <TABLEUPDATES>
        <TUPDATE>
            <PKGFIELDS>
                <PKGFLD>...</PKGFLD>
                <PKGFLD>...</PKGFLD>
            </PKGFIELDS>
        </TUPDATE>
    </TABLEUPDATES>
    <TABLEUPDATES>
        <TUPDATE>
            <PKGFIELDS>
                <PKGFLD>...</PKGFLD>
                <PKGFLD>...</PKGFLD>
                (etc.)
            </PKGFIELDS>
        </TUPDATE>
    </TABLEUPDATES>
        (etc.)
</AXDATAPACKET>
{wrapper tags}
```

3.3.3 Tags

3.3.3.1 The <AXDATAPACKET> tag

The <AXDATAPACKET>...</AXDATAPACKET> pair delimits a package definition. The tag has the following attributes;

| Attribute | Optional? | Description |
|---|---|---|
| BODY | No | This field gives the name by which the data package is known |
| UPDATELOCALDATA | No | Specifies whether the package is to update the local database. |
| SENDTOAPP | No | Specifies whether the package is sent to the application server |

FIG. 17P

Appendix "A"

3.3.3.2 The <TABLEUPDATES> tag

The <TABLEUPDATES>...</TABLEUPDATES> pair marks the start and end of the table definitions section. It has no attributes.

3.3.3.3 The <TUPDATE> tag

Each table update is enclosed within the <TUPDATE>...</TUPDATE> pair. The TUPDATE tag has the following attributes;

| Attribute | Optional? | Description |
|---|---|---|
| TABLE | No | The table in the database that is updated |
| UPDATETYPE | No | The type of update that is being made to the database. Possible values are; <br> ADD – adds a new record into the table <br> DELETE – removes a record into the table <br> UPDATE – modifies a record in the table |
| WHEREFIELD | Yes | For a conditional update of a table, specifies the field and table to match on. This is in the format "table(field)". |
| WHEREPARAM | Yes | Text string specifying the value. This tag has no meaning and will be skipped unless the WHEREFIELD attribute has been specified. |
| SECTION | No | An identifier for the section in the data package |
| MULTIROW | No | Boolean field specifying whether multiple rows can be updated by the tag |
| MULTIROWIDENT | Yes | If the MULTIROW attribute is set to 'YES', this field is required and specifies the |

3.3.3.4 The <PKGFIELDS> tag

The <PKGFIELDS>...</PKGFIELDS> tag pair marks where the fields in a given data package are defined. The PKGFIELDS tag has no attributes.

3.3.3.5 <The PKGFLD> tag

The <PKGFLD>...</PKGFLD> tag pair defines a single parameter in a given data package. Enclosed between the <PKGFLD>...</PKGFLD> tags is the field name. The <PKGFLD> tag has the following attributes;

| Attribute | Optional? | Description |
|---|---|---|
| NAME | No | This is the field in the AIRIX database that maps to the user |

FIG. 17Q

Appendix "A"

| | | interface field |
|---|---|---|
| PARAMTYPE | No | This defines the type of parameter. It can take two values;<br>PROP – this means that the parameter appears as part of the tag definition<br>VALUE – this means that the parameter is contained between the two tags. Only one parameter in a given data package can be of this type |

FIG. 17R

Appendix "A"

3.3.4 Example

Using the table definitions example in section 3.2.4, when the user sends an email, a data package to transport the data would update the 'SENTITEMS' table and the 'RECIPIENTS' table. The following ARML fragment defines such a data package;

```
<AXDATAPACKET BODY="ME" SENDTOMOBILE="NO" SENDTOAPP="YES">
   <TABLEUPDATES>
      <TUPDATE TABLE="SENTITEMS" UPDATETYPE="ADD" WHEREFIELD=""
      WHEREPARAM=""
            WHERETYPE="PROP" SECTION="MAIL" MULTIROW="NO" MULTIROWIDENT="">
         <FIELDS>
            <PKGFLD NAME="LNGMESSAGEID" PARAMTYPE="PROP">MSGID</PKGFLD>
            <PKGFLD NAME="VARFROM" PARAMTYPE="PROP">FROM</PKGFLD>
            <PKGFLD NAME="VARSUBJECT" PARAMTYPE="PROP">SUBJECT</PKGFLD>
            <PKGFLD NAME="MEMBODY" PARAMTYPE="VALUE">DATA</PKGFLD>
         </FIELDS>
      </TUPDATE>
      <TUPDATE TABLE="RECIPIENTS" UPDATETYPE="ADD" WHEREFIELD=""
      WHEREPARAM=""
            WHERETYPE="PROP" SECTION="RECIPS" MULTIROW="YES"
            MULTIROWIDENT="RCP">
         <FIELDS>
            <PKGFLD NAME="LNGMESSAGEID" PARAMTYPE="PROP">MSGID</PKGFLD>
            <PKGFLD NAME="VARFULLNAME" PARAMTYPE="PROP">TO</PKGFLD>
            <PKGFLD NAME="VARADDRESS" PARAMTYPE="PROP">ADDRESS</PKGFLD>
         </FIELDS>
      </TUPDATE>
   </TABLEUPDATES>
</AXDATAPACKET>
```

Figure 4 - a sample package definition

FIG. 17S

Appendix "A"

3.4 Device Interface Definitions Section

3.4.1 Description

The display definitions section contains the user interface definitions for the various mobile devices that an application supports.

3.4.2 Structure

The device display definitions section has the following structure;

```
{wrapper tags}
<DEV>
      <SCREENS>
            <SCREEN>
                   (screen definitions)
            </SCREEN>
      </SCREENS>
</DEV>
(other devices)
{wrapper tags}
```

3.4.3 Tags

3.4.3.1 The <DEV> tag

The <DEV>...</DEV> pair delimits an interface definition for a specific device. The tag has the following attributes;

| Attribute | Optional? | Description |
| --- | --- | --- |
| TYPE | No | The type of device. Allowed values are:<br>RIM – a Research in Motion Blackberry pager<br>WAP – a WAP phone<br>CE – Pocket PC |

3.4.3.2 The <SCREENS> tag

The <SCREENS>...</SCREENS> pair delimits the screens definition for a specific device. The tag has one attribute;

| Attribute | Optional? | Description |
| --- | --- | --- |
| STSCRN | No | The first screen that is displayed when the application starts |

FIG. 17T

Appendix "A"

3.4.3.3 The <SCREEN> tag

The <SCREEN>...</SCREEN> pair, and its contents are described in section 5.1.3.1

Appendix "A"

3.4.4 Example
The following example shows the screen definitions section for an application that allows a user to view their inbox and the mails in it.

```
{wrapper tags}
<DEV TYPE="RIM">
     <SCREENS>
          <SCREEN NAME="INBOX ">
               {screen definition}
          </SCREEN>
          <SCREEN NAME="VIEWNEWMAIL">
               {screen definition}
          </SCREEN>
     </SCREENS>
</DEV>
<DEV TYPE="PALM">
     <SCREENS>
          <SCREEN NAME="INBOX">
               {screen definition}
          </SCREEN>
          <SCREEN NAME="VIEWNEWMAIL">
               {screen definition}
          </SCREEN>
     </SCREENS>
</DEV>
{wrapper tags}
```

FIG. 17V

Appendix "A"

4 Application-defined packages

This section describes the format of application defined packages.

4.1 General

This section describes the general structure of an application-specific data package.
As described in section , ;

4.1.1 Description

System level packages are sent between AIRIX and the application server, and between AIRIX and the AVM

4.1.2 Structure

An application defined package has the following structure;

```
<ARML>
    <HEAD>
        (header information)
    </HEAD>
    <PKG>
        (package information)
    </PKG>
</ARML>
```

4.1.3 Tags

4.1.3.1 The <HEAD> tag

The <HEAD> tag is as described in section 7.1.3.1

4.1.3.2 The <PKG> tag

The <PKG>...</PKG> tags delimit the package data. The PKG tag has the following attributes;

| Attribute | Optional? | Description |
|---|---|---|
| TYPE | No | A text string identifying the type of package being sent |

FIG. 17W

Appendix "A"

4.2 Package information
The format and rules for application-defined data packages depend on the package definitions for that application.

4.2.1 Example
A sample data package following the rules in section 3.3.4 would have a body section like this;

```
{wrapper tags}
<PKG TYPE="ME">
    <MAIL MSGID="1" FROM="Tim Neil" FROMADDRESS="timn@nextair.com"
        SUBJECT="Hello Back">
    <DATA>I am responding to your message</DATA>
    </MAIL>
    <RECIPS>
        <RCP MSGID="1" TO="Jeff Jones"
            ADDRESS="jeff@nextair.com"></RCP>
        <RCP MSGID="1" TO="Scott Neil"
            ADDRESS="scottn@nextair.com"></RCP>
        <RCP MSGID="1" TO="Steve Hulaj"
            ADDRESS="steveh@nextair.com"></RCP>
    </RECIPS>
</PKG>
{wrapper tags}
```

Figure 5 - a sample package

We will use this sample package to illustrate how packages are derived from the package definition file. The first tag in the package is the BODY tag. This tag defines which type of package it is;

Package Definition
```
<AXDATAPACKET BODY="ME" UPDATELOCALDATA="NO"
```
Package
```
<BODY TYPE="ME">
```

The package has two sections, which correspond to the two table update sections in the package definition;

FIG. 17X

Appendix "A"

Package Definition

```
<TUPDATE TABLE="SENTITEMS" UPDATETYPE="ADD" WHEREFIELD="" WHEREPARAM=""
    WHERETYPE="PROP" SECTION="MAIL" MULTIROW="NO" MULTIROWIDENT="">

<TUPDATE TABLE="RECIPIENTS" UPDATETYPE="ADD" WHEREFIELD="" WHEREPARAM=""
    WHERETYPE="PROP" SECTION="RECIPS" MULTIROW="YES"
    MULTIROWIDENT="RCP">
    Package <MAIL MSGID="1" FROM="Tim Neil"

<RECIPS>
        <RCP>
        <RCP>
        <RCP>
    </RECIPS>
```

The 'MAIL' section updates the 'SENTITEMS' table in the database. It does not update multiple rows. The 'RECIPS' section updates the 'RECIPIENTS' table in the database; it does update multiple rows, and each row is contained within a pair of <RCP> tags.

Each of the MAIL and RCP tags have fields which are used to update the field in the database tables;

Package Definition

```
<FIELDS>
    <PKGFLD NAME="LNGMESSAGEID" PARAMTYPE="PROP">MSGID</PKGFLD>

<PKGFLD NAME="VARFULLNAME" PARAMTYPE="PROP">TO</PKGFLD>

<PKGFLD NAME="VARADDRESS" PARAMTYPE="PROP">ADDRESS</PKGFLD>
</FIELDS>
    Package
<RCP MSGID="1" TO="Jeff Jones" ADDRESS="jeff@nextair.com"></RCP>
```

FIG. 17Y

Appendix "A"

5 User interface Definitions

5.1 General

5.1.1 Description
A screen definition file defines a single screen for a specific device.

5.1.2 Structure
A screen definition file has the following structure;

```
<ARML>
    <SCREEN>
        <EVENTS>
            <EVENT>
                <ACTION>...</ACTION>
            </EVENT>
        </EVENTS>
        <QUERIES>
            (menu definition)
        </QUERIES>
        <MENUS>
            (menu definition)
        </MENUS>
        <BUTTONS>
            (button definitions)
        </BUTTONS>
        <TEXTITEMS>
            (textitem definitions)
        </TEXTITEMS>
        <EDITBOXES>
            (edit box definitions)
        </EDITBOXES>
        <CHOICEITEMS>
            (choice item definitions)
        </CHOICEITEMS>
        <IMAGES>
            (image definitions)
        </IMAGES>
        <LISTBOXES>
            (list box definitions)
        </LISTBOXES>
        <CHECKBOXES>
            (check box definitions)
        </CHECKBOXES>
        <GRIDS>
            (check grid definition)
```

FIG. 17Z

Appendix "A"

```
        </GRIDS>
    </SCREEN>
</ARML>
```

5.1.3 Tags

5.1.3.1 The SCREEN tag

The <SCREEN>...</SCREEN> pair marks the start and end of the screen definitions section. It has attribute –

| Attribute | Optional? | Description |
|---|---|---|
| NAME | No | An identifier for the screen. This is used to qualify variables and navigate between screens |
| TITLE | No | The title that appears for the screen. |
| BACKGROUND | Yes | If used, an image that appears behind the interface elements |
| ORDERED | Yes, only applicable on WAP | If yes, WML is created with ORDERED property set to true, if NO, WML is created with ORDERED property set to false. Only applicable on WAP. See WML standard for definition of ORDERED. |

5.1.3.2 The <EVENTS> tag

The <EVENT>...</EVENT> pair marks the start and end of a user-interface level event definition. See section 6 for a detailed discussion of the Smart Client event model.

5.1.3.3 The <EVENT> tag

The <EVENT>...</EVENT> pair marks the start and end of a user-interface level event definition. See section 6 for a detailed discussion of the Smart Client event model.

5.1.3.4 The <ACTION> tag

The <ACTION>...</ACTION> pair marks the start and end of an action definition. See section 6 for a detailed discussion of the Smart Client event model.

5.1.3.5 The QUERIES tag

The <QUERIES>...</QUERIES> pair marks the start and end of the queries definitions section. It has no attributes.

FIG. 17AA

Appendix "A"

5.1.3.6 The MENUS tag
The <MENUS>...</MENUS> pair marks the start and end of the menu definition section. It has no attributes.

5.1.3.7 The BUTTONS tag
The <BUTTONS>...</BUTTONS> pair marks the start and end of the button definitions section. It has no attributes.

5.1.3.8 The TEXTITEMS tag
The <TEXTITEMS>...</TEXTITEMS> pair marks the start and end of the text items section. It has no attributes.

5.1.3.9 The EDITBOXES tag
The <EDITBOXES>...</EDITBOXES> pair marks the start and end of the editboxes section. It has no attributes.

5.1.3.10   The CHOICEITEMS tag
The <CHOICEITEMS>...</CHOICEITEMS> pair marks the start and end of the choiceitems section. It has no attributes.

5.1.3.11   The IMAGES tag
The <IMAGES>...</IMAGES> pair marks the start and end of the images section. It has no attributes.

5.1.3.12   The CHECKBOXES tag
The <CHECKBOXES>...</CHECKBOXES> pair marks the start and end of the checkboxes section. It has no attributes.

5.1.3.13   The LISTBOXES tag
The <LISTBOXES>...</LISTBOXES> pair marks the start and end of the listboxes section. It has no attributes.

5.1.3.14   The GRIDS tag
The <GRIDS>...</GRIDS> pair marks the start and end of the grids section. It has no attributes.

FIG. 17BB

Appendix "A"

5.2 Queries definition section

5.2.1 Description
The queries definition section describes any queries that need to be run to populate a screen.

5.2.2 Structure
The queries definition section has the following structure;

```
{wrapper tags}
<QUERIES>
        <QUERY>
                <W>...</W>
        </QUERY>
</QUERIES>
{wrapper tags}
```

5.2.3 Tags

5.2.3.1 The <QUERIES> tag
The <QUERIES> ... </QUERIES> pair marks the start and end of query definition section. It has no attributes.

5.2.3.2 The <QUERY> tag
The <QUERY>...</QUERY> pair marks the start and end of a given query. It has the following attributes;

| Attribute | Optional? | Description |
|---|---|---|
| NAME | No | Name of the query. |
| TABLE | No | The table in the database that is updated |
| ORDERBY | Yes | Specifies the name of the field in the table that the results are to be ordered on. |
| ORDERDIR | Yes | ASC or DESC, sort ascending or descending respectively. If ORDERBY is present and ORDERDIR is not, ASC is assumed. |

FIG. 17CC

Appendix "A"

5.2.3.3 The <W> tag

The <W>...</W> pair marks the start and end of a given where clause. The value of the parameter is contained within the <W>...</W> tags. This value can be a specific value or a reference to a user interface field in the format "[SP.screen.savename] or [QU.query.field]". It has the following attributes;

| Attribute | Optional? | Description |
|---|---|---|
| F | No | Specifies the field to match on. |
| E | No | Specifies the expression type. Available expression types include:<br>EQ<br>NE<br>LT<br>GT<br>BW (applicable only to fields of type STRING) |

5.3 Menu definition section

5.3.1 Description
The menu definition section describes the menu for a given screen.

5.3.2 Structure
The menu definition section has the following structure;

```
{wrapper tags}

<MENUS>
    <MENU>
        <MENUITEM>
            <EVENTS>
                <EVENT>
                    <ACTION>...</ACTION>
                </EVENT>
            </EVENTS>
        </MENUITEM>
    </MENU>
</MENUS>
{wrapper tags}
```

5.3.3 Tags

FIG. 17DD

Appendix "A"

5.3.3.1 The <MENUS> tag

The <MENUS> ... </MENUS> pair marks the start and end of menu definition section. It has no attributes.

5.3.3.2 The <MENU> tag

The <MENU> ... </MENU> pair marks the start and end of a menu definition. It has the following attributes.

| Attribute | Optional? | Description |
|---|---|---|
| NAME | No | An internal identifier for the menu |
| CAPTION | No | The text that appears for this item in the menu |

5.3.3.3 The <MENUITEM> tag

The <MENUITEM>...</MENUITEM> pair marks the start and end of a menuitem definition. It has the following tags;

| Attribute | Optional? | Description |
|---|---|---|
| NAME | No | An internal identifier for the menu |
| CAPTION | No | The text that appears for this item in the menu |
| INDEX | Yes | The index of this menu item with respect to all of the menu items on this menu. |
| READONLY | Yes | If True, the menu item is inactive. False is the default. |

5.3.3.4 The <EVENTS> tag

The <EVENT>...</EVENT> pair marks the start and end of a user-interface level event definition. See section 6 for a detailed discussion of the Smart Client event model.

5.3.3.5 The <EVENT> tag

The <EVENT>...</EVENT> pair marks the start and end of a user-interface level event definition. See section 6 for a detailed discussion of the Smart Client event model.

5.3.3.6 The <ACTION> tag

The <ACTION>...</ACTION> pair marks the start and end of an action definition. See section 6 for a detailed discussion of the Smart Client event model.

FIG. 17EE

Appendix "A"

5.4 Buttons definition section

5.4.1 Description
The buttons definition section describes the buttons that appear on a given screen.

5.4.2 Structure
The buttons definition section has the following structure;

```
{wrapper tags}
<BTN>
      <EVENTS>
            <EVENT>
                  <ACTION>...</ACTION>
            </EVENT>
      </EVENTS>
</BTN>
{wrapper tags}
```

5.4.3 Tags

5.4.3.1 The BTN tag
The <BTN>...</BTN> pair marks the start and end of a button definition. It has one attribute –

| Attribute | Optional? | Description |
|---|---|---|
| NAME | No | An identifier for the button. |
| INDEX | No | The order in which the button appears |
| CAPTION | No | The caption that appears on a given button |
| X | Yes | The X-coordinate of the button on the screen. This attribute may not be meaningful in some display environments, in which case it would be skipped without processing by the parser |
| Y | Yes | The Y-coordinate of the button on the screen. This attribute may not be meaningful in some display environments, in which case it would be skipped without processing by the parser |
| HT | Yes | This is the Height of the button. This attribute may not be meaningful in some display environments, in which case it would be skipped without processing by the parser |
| WT | Yes | This is the Width of the Button. This attribute may not be meaningful in some display environments, in which case it would be skipped without processing by the parser |
| READONLY | Yes | If True, the button is not enabled. False is the default. |

FIG. 17FF

Appendix "A"

5.4.3.2 The <EVENTS> tag

The <EVENT>...</EVENT> pair marks the start and end of a user-interface level event definition. See section 6 for a detailed discussion of the Smart Client event model.

5.4.3.3 The <EVENT> tag

The <EVENT>...</EVENT> pair marks the start and end of a user-interface level event definition. See section 6 for a detailed discussion of the Smart Client event model.

5.4.3.4 The <ACTION> tag

The <ACTION>...</ACTION> pair marks the start and end of an action definition. See section 6 for a detailed discussion of the Smart Client event model.

5.5 Text Items definition section

5.5.1 Description
The text items definition

5.5.2 Structure
The text items section has the following structure;

```
{wrapper tags}
<TI>
      <EVENTS>
            <EVENT>
                  <ACTION>...</ACTION>
            </EVENT>
      </EVENTS>
</TI>
{wrapper tags}
```

5.5.3 Tags

5.5.3.1 The TI tag

The <TI>...</TI> pair marks the start and end of the screen definitions section. It has attribute –

| Attribute | Optional? | Description |
|---|---|---|
| INDEX | No | The order in which the text item appears |

FIG. 17GG

Appendix "A"

| NAME | No | An Identifier for the Text Item |
|---|---|---|
| CAPTION | No | Text to appear on the Text Item |
| X | Yes | The X-coordinate of the text item on the screen. This attribute may not be meaningful in some display environments, in which case it would be skipped without processing by the parser |
| Y | Yes | The Y-coordinate of the text item on the screen. This attribute may not be meaningful in some display environments, in which case it would be skipped without processing by the parser |
| HT | Yes | This is the Height of the Text Item. This attribute may not be meaningful in some display environments, in which case it would be skipped without processing by the parser |
| WT | Yes | This is the Width of the Text Item. This attribute may not be meaningful in some display environments, in which case it would be skipped without processing by the parser |

5.5.3.2 The <EVENTS> tag

The <EVENT>...</EVENT> pair marks the start and end of a user-interface level event definitio-n. See section 6 for a detailed discussion of the Smart Client event model.

5.5.3.3 The <EVENT> tag

The <EVENT>...</EVENT> pair marks the start and end of a user-interface level event definition. See section 6 for a detailed discussion of the Smart Client event model.

5.5.3.4 The <ACTION> tag

The <ACTION>...</ACTION> pair marks the start and end of an action definition. See section 6 for a detailed discussion of the Smart Client event model.

5.6 Edit boxes definition section

5.6.1 Description
The edit boxes definition section describes what edit boxes exist for the screen.

5.6.2 Structure
The edit boxes section has the following structure;

FIG. 17HH

Appendix "A"

```
{wrapper tags}
<EB>
    <EVENTS>
        <EVENT>
            <ACTION>...</ACTION>
        </EVENT>
    </EVENTS>
</EB>
{wrapper tags}
```

5.6.3 Tags

5.6.3.1 The EB tag

The <EB>...</EB> pair marks an edit box definition. It has the following attributes –

| Attribute | Optional? | Description |
|---|---|---|
| NAME | No | An identifier for the edit box. |
| TEXT | No | The text to display in the edit box before any entry has been made. Only used if the DATASRC attribute is invalid or omitted. Can be a scratchpad or query value of the form [SP.screen.savename] or [QU.query.field]. |
| INDEX | No | The order in which the edit box appears |
| CAPTION | No | The caption for on a given edit box. |
| MULTILINE | No | Boolean field that indicates whether the edit box is a multiline field. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing by the parser |
| WT | Yes | The Width of the Edit Box. This attribute may not be meaningful in some display environments, in which case it would be skipped without processing by the parser |
| FT | Yes | Specifies the type of value expected (INT, STRING, |

FIG. 17II

Appendix "A"

| | | |
|---|---|---|
| | | MEMO,DATETIME) for the VM to validate prior to continuing a Save. If omitted, STRING is the default data type. |
| DATASRC | Yes | If present, the query and field in the query that populates this edit box. This is given in the format "query.field". |
| READONLY | Yes | If "TRUE" the edit box will be read only, otherwise it is editable. "FALSE is the default value. |

5.6.3.2 The <EVENTS> tag

The <EVENT>...</EVENT> pair marks the start and end of a user-interface level event definition. See section 6 for a detailed discussion of the Smart Client event model.

5.6.3.3 The <EVENT> tag

The <EVENT>...</EVENT> pair marks the start and end of a user-interface level event definition. See section 6 for a detailed discussion of the Smart Client event model.

5.6.3.4 The <ACTION> tag

The <ACTION>...</ACTION> pair marks the start and end of an action definition. See section 6 for a detailed discussion of the Smart Client event model.

5.7 Choice items definition section

5.7.1 Description

The choice item definitions section describes the choice items that exist on a given screen. A choice item is an interface item that requires the user to make a selection from a list of options. It can be represented in different ways on different devices; on a RIM pager, it is a choice box, while on a WinCE device, it is a drop-down list.

5.7.2 Structure

The choice items section has the following structure;

```
{wrapper tags}
<CHOICE>
      <EVENTS>
            <EVENT>
                  <ACTION>...</ACTION>
            </EVENT>
      </EVENTS>
      <ITEMS>
            <I>...</I>
```

FIG. 17JJ

Appendix "A"

```
</ITEMS>
</CHOICE>
{wrapper tags}
```

5.7.3 Tags

5.7.3.1 The <CHOICE> tag

The <CHOICE>...</CHOICE> pair marks the start and end of a choice item definition. It has these attributes –

| Attribute | Optional? | Description |
|---|---|---|
| NAME | No | An identifier for the choice item. |
| TEXT | No | The text to display in the choice item before any selection has been made. |
| INDEX | No | The order in which the choice item appears |
| CAPTION | No | The caption that appears for a given choice item |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the choice item on the screen. This attribute may not be meaningful in some display environments, in which case it would be skipped without processing by the parser |
| Y | Yes | The Y-coordinate of the choice item on the screen. This attribute may not be meaningful in some display environments, in which case it would be skipped without processing by the parser |
| DATASRC | Yes | If present, the query and field in the query that populates this choice item. This is given in the format "query.field". |
| IDDATASRC | Yes | If present, the query and field in the query that populates the Ids for this choice item. This is given in the format "query.field". The ID values created by the attributes should correspond directly to the choice item values. I.e. they should create a value, id pair. |
| READONLY | Yes | If "True", the control cannot be modified. "False" is the default. |
| SI | Yes | The value to indicate which item of the choice item is to be selected when loaded. This value will be compared with the ID property (hard-coded items) or the IDDATASRC property (database items). |

FIG. 17KK

Appendix "A"

5.7.3.2 The <ITEMS> tag

The <ITEMS>...</ITEMS> pair marks the start and end of a list of items to be included in the in the choice item. If a datasrc is specified, the <ITEMS> section is ignored.

5.7.3.3 The <I> tag

The <I>...</I> pair marks the start and end of an individual item in the choice items list. It has the following attributes:

| Attribute | Optional? | Description |
|---|---|---|
| ID | Yes | An id used to identify this item in the list. |

The value between the pair is the text value that is to be displayed in the choice item.

5.7.3.4 The <EVENTS> tag

The <EVENT>...</EVENT> pair marks the start and end of a user-interface level event definition. See section 6 for a detailed discussion of the Smart Client event model.

5.7.3.5 The <EVENT> tag

The <EVENT>...</EVENT> pair marks the start and end of a user-interface level event definition. See section 6 for a detailed discussion of the Smart Client event model.

5.7.3.6 The <ACTION> tag

The <ACTION>...</ACTION> pair marks the start and end of an action definition. See section 6 for a detailed discussion of the Smart Client event model.

5.8 Checkboxes definition section

5.8.1 Description
The checkboxes section describes a check box that appears on a given screen.

5.8.2 Structure
The checkboxes section has the following structure;

FIG. 17LL

Appendix "A"

```
{wrapper tags}
    <CHK>
        <EVENTS>
            <EVENT>
                <ACTION>...</ACTION>
            </EVENT>
        </EVENTS>
    </CHK>
{wrapper tags}
```

5.8.3 Tags

5.8.3.1 The CHK tag

The <CHK>...</CHK> pair marks a check box definition

| Attribute | Optional? | Description |
|---|---|---|
| NAME | No | An identifier for the check box. |
| INDEX | No | The index of this control with respect to the list of all controls on the screen. |
| CAPTION | No | The text to be displayed for this check box if the DATASRC is not available or is not specified. |
| Save | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the check box on the screen. This attribute may not be meaningful in some display environments, in which case it would be skipped without processing by the parser |
| Y | Yes | The Y-coordinate of the check box on the screen. This attribute may not be meaningful in some display environments, in which case it would be skipped without processing by the parser |
| HT | Yes | The Height of the Checkbox. This attribute may not be meaningful in some display environments, in which case it would be skipped without processing by the parser |
| WT | Yes | The Width of the Checkbox. This attribute may not be meaningful in some display environments, in which case it would be skipped without processing by the parser |
| DATASRC | Yes | If present, the query and field in the query that populates this check box. This is given in the format "query.field". |
| VALUE | Yes | If present, specifies the initial state of the check box ('TRUE' = checked, 'FALSE' = Unchecked. If unspecified, FALSE is the default value. |
| READONLY | Yes | If "TRUE" the check box cannot be modified. "FALSE" is the default value. |

FIG. 17MM

Appendix "A"

5.8.3.2 The <EVENTS> tag
The <EVENT>...</EVENT> pair marks the start and end of a user-interface level event definition. See section 6 for a detailed discussion of the Smart Client event model.

5.8.3.3 The <EVENT> tag
The <EVENT>...</EVENT> pair marks the start and end of a user-interface level event definition. See section 6 for a detailed discussion of the Smart Client event model.

5.8.3.4 The <ACTION> tag
The <ACTION>...</ACTION> pair marks the start and end of an action definition. See section 6 for a detailed discussion of the Smart Client event model.

5.9 Listboxes definition section
5.9.1 Description
The listboxes section describes a list box that appears on a given screen.

5.9.2 Structure
The listboxes section has the following structure;

```
{wrapper tags}
    <LB>
        <EVENTS>
            <EVENT>
                <ACTION> ... </ACTION>
            </EVENT>
        </EVENTS>
        <ITEMS>
            <I> ... </I>
        </ITEMS>
    </LB>
{wrapper tags}
```

5.9.3 Tags

5.9.3.1 The LB tag
The <LB>...</LB> pair marks a list box definition

FIG. 17NN

Appendix "A"

| Attribute | Optional? | Description |
|---|---|---|
| NAME | No | An identifier for the list box. |
| INDEX | No | The index of this control with respect to all of the controls on the screen. |
| CAPTION | No | The text to be displayed as the title of this list box, where applicable. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes'. |
| X | Yes | The X-coordinate of the list box on the screen. This attribute may not be meaningful in some display environments, in which case it would be skipped without processing by the parser |
| Y | Yes | The Y-coordinate of the list box on the screen. This attribute may not be meaningful in some display environments, in which case it would be skipped without processing by the parser |
| HT | Yes | The Height of the Listbox. This attribute may not be meaningful in some display environments, in which case it would be skipped without processing by the parser |
| WT | Yes | The Width of the Listbox. This attribute may not be meaningful in some display environments, in which case it would be skipped without processing by the parser |
| DATASRC | Yes | If present, the query and field in the query that populates this list box. This is given in the format "query.field". |
| IDDATASRC | Yes | If present, the query and field in the query that populates the list box Ids. This is given in the format "query.field". This value will create a list of ID values that correspond to the list box values in DATASRC. I.e. they should create a value, id pair. |
| READONLY | Yes | If "TRUE" the list box cannot be modified. "FALSE" is the default. |
| SI | Yes | The value to indicate which item of the choice item is to be selected when loaded. This value will be compared with the ID property (hard-coded items) or the IDDATASRC property (database items). |

5.9.3.2 The <ITEMS> tag

The <ITEMS>...</ITEMS> pair marks the start and end of a list of items to be included in the in the list box. If a datasrc is specified, the <ITEMS> section is ignored.

5.9.3.3 The <I> tag

The <I>...</I> pair marks the start and end of an individual item in the list box items list. It has the following attributes:

FIG. 1700

Appendix "A"

| Attribute | Optional? | Description |
|---|---|---|
| ID | Yes | An id used to identify this item in the list. |

The value between the pair is the text value that is to be displayed in the list box. Can be a scratchpad or query value of the form [SP.screen.savename] or [QU.query.field].

5.9.3.4 The <EVENTS> tag

The <EVENT>...</EVENT> pair marks the start and end of a user-interface level event definition. See section 6 for a detailed discussion of the Smart Client event model.

5.9.3.5 The <EVENT> tag

The <EVENT>...</EVENT> pair marks the start and end of a user-interface level event definition. See section 6 for a detailed discussion of the Smart Client event model.

5.9.3.6 The <ACTION> tag

The <ACTION>...</ACTION> pair marks the start and end of an action definition. See section 6 for a detailed discussion of the Smart Client event model.

5.10 Grids

5.10.1 Description
Grids allow data to be displayed in row-column format. Grids can display data from a data source (query) or they can contain hard coded values. Each column in a grid can be visible or hidden. Hidden values are maintained, but not visible to the user.

5.10.2 Structure
The grids section has the following structure;

```
{wrapper tags}
     <GRID>
          <COLS>
               <COL> ... </COL>
          </COLS>
          <ROWS>
               <R>
                    <V> ... </V>
```

FIG. 17PP

Appendix "A"

```
            </R>
         </ROWS>
      </GRID>
{wrapper tags}
```

5.10.3 Tags

5.10.3.1   GRID Tag

<GRID>...</GRID> The grid item itself will have the following attributes

| Attribute | Optional? | Description |
|---|---|---|
| NAME | No | An identifier for the edit box. |
| INDEX | No | The order in which the edit box appears |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing by the parser |
| WT | Yes | The Width of the Edit Box. This attribute may not be meaningful in some display environments, in which case it would be skipped without processing by the parser |
| GRDSRC | Yes | This is the Query on the screen that will provide the data to the grid. No field name will be specified in this value |

5.10.3.2   COLS Tag

<COLS>...</COLS> This tag contains no attributes. But instead contains all the columns that are associated with the grid in the order in which they appear from left to right.

5.10.3.3   COL Tag

<COL>...</COL> This tag will determine the column specification for the grid. The attributes for this item are the following:

| Attribute | Optional? | Description |
|---|---|---|

FIG. 17QQ

Appendix "A"

| CAPTION | Yes | This is the caption that appears at the top of the grid where applicable. |
|---|---|---|
| FIELDNAME | Yes | This field name represents the Field to pull information from out of the GRDSRC of the grid control. |
| SAVE | No | This true false value will be checked when the SAVE action is called to save values to the scratchpad |
| SAVENAME | Yes | This is the name in which the data will be saved when the SAVE action is called and the column is marked for Saving |
| WT | Yes | The Width of the Edit Box. This attribute may not be meaningful in some display environments, in which case it would be skipped without processing by the parser |

5.10.3.4  ROWS Tag

<ROWS>...</ROWS> This will Indicate any hard coded rows that would be created in the design studio. It does not contain any attributes but instead contains all the row definitions.

5.10.3.5  R Tag

<R>...</R> This is the row declaration that contains all the values for the row that has been hard coded. It has no attributes itself, but contains the value definitions for the row.

5.10.3.6  V Tag

<V>...</V> This definition contains the data that is related to the ROW and to the column.

5.10.4 Example

An example of a grid declaration is as follows:

```
<GRID INDEX="2" NAME="mygrid" X="10" Y="50" HT="100" WT="100" GRDSRC="QUERY1">
<COLS>
<COL CAPTION="Id" FIELDNAME="lngID" SAVE="TRUE" SAVENAME="lngID" WT="20"></COL>
<COL CAPTION="Subject" FIELDNAME="strSubject" SAVE="TRUE" SAVENAME="Sub" WT="80"></COL>
</COLS>
<ROWS>
  <R>
    <V>343432</V>
    <V>This is a subject</V>
  </R>
  <R>
```

FIG. 17RR

Appendix "A"

```
    <V>5456</V>
    <V>This is another subject</V>
  </R>
</ROWS>
</GRID>
```

FIG. 17SS

Appendix "A"

6 The Smart Client event model

The Smart Client has a set of actions that it ties to events. Events can occur at the application level, the screen level or the user interface item level; an application level event is listened for throughout the operation of the application, a screen level event is listened for while the screen is displayed, and so on. If an action for an event is defined at multiple levels, the lowest level has precedence; i.e., user interface actions override screen level actions, which override application level actions. An attempt to list an event multiple times at the same level (application, screen, item) is invalid and will generate an error message.

The following ARML fragment illustrates this schema (tags and attributes not relevant to the event model have been omitted);

```
<AXTSCHDEF>
    <EVENTS>
        <EVENT>
            <ACTION>...</ACTION>
            <ACTION>...</ACTION>
        <EVENTS>
        <EVENT>
            <ACTION>...</ACTION>
        </EVENT>
    </EVENTS>
    <INTERFACE>
        <SCREEN>
            <EVENT>
                <ACTION>...</ACTION>
            </EVENT>
            <EVENT>
                <ACTION>...</ACTION>
            </EVENT>
            <BUTTON>
                <EVENT>
                    <ACTION>...</ACTION>
                </EVENT>
                <EVENT>
                    <ACTION>...</ACTION>
                </EVENT>
            </BUTTON>
        </SCREEN>
    </INTERFACE>
</AXTSCHDEF>
```

FIG. 17TT

Appendix "A"

6.1 The EVENTS tag

The <EVENTS>...</EVENTS> pair marks the start and end of the events section. It has no attributes.

6.2 The EVENT tag

The <EVENT>...</EVENT> pair marks the start and end of an event definition. It has the following attributes;

| Attribute | Optional? | Description |
|---|---|---|
| TYPE | No | The type of event that should be performed when the button is pushed. Allowed values are; BUTTONCLICK MENUITEMSELECTED DATA |

6.2.1 The BUTTONCLICK event

The button click event occurs when the user selects a button. It has no attributes.

6.2.2 The MENUITEMSELECTED event

The menu items selected event occurs when the user selects a menu item. It has no attributes.

6.2.3 The DATA event

The data event occurs when ARML data is received from the wireless interface. It has the following attributes;

| Attribute | Optional? | Description |
|---|---|---|
| NAME | No | The identifier of the specific package |

6.3 The ACTION tag

The <ACTION>...</ACTION> pair marks the start and end of an event definition. It has one fixed attribute, and a number of attributes that may or may not appear depending on the type of action required. The fixed attribute is;

| Attribute | Optional? | Description |
|---|---|---|
| TYPE | No | The type of action that should be performed when the button is pushed. |

FIG. 17UU

Appendix "A"

| | | Allowed values are;<br>OPEN<br>ARML<br>SAVE<br>PURGE<br>NOTIFY<br>CLOSE<br>ALERT<br>IF...Then...Else<br>CLOSESCREEN<br>REFRESH<br>SAVEITEM |
|---|---|---|

6.3.1 The OPEN action

The open action tells the Smart Client to open a new screen. It adds one extra attribute to the ACTION tag;

| Attribute | Optional? | Description |
|---|---|---|
| NAME | No | The name of the screen to open |
| NEWINST | Yes | If true, a new instance of the screen is created. If false, the least recently used instance of the screen is opened and the data is not refreshed. True is the default. |

6.3.2 The ARML action

The arml action tells the Smart Client to compose and send an arml package. It does not add any attributes to the ACTION tag, but has the following subtag;

*<ARMLTEXT>*

Contained between the <ARMLTEXT>...</ARMLTEXT> pair is one of the application-defined data packages. Individual data items are marked with the user interface item that their value should be taken from, in the format "[SP.*screen.savename*]", or [QU.*query.field*]. If *screen* is not the current screen, then the Smart Client will look for the data in its scratchpad. See section 0 for an example of the ARML action.

6.3.3 The SAVE action

The save action tells the Smart Client to save all fields marked as persistent (i.e., they are defined with SAVE="Yes") to be saved to the scratchpad area. It has no attributes.

FIG. 17VV

Appendix "A"

6.3.4 The PURGE action
The purge action tells the Smart Client to clear all fields that have been saved to the scratchpad. It has no attributes.

6.3.5 The NOTIFY action
The notify action tells the Smart Client to activate the configured notification on a device. For devices where this has no meaning, it will cause a beep to be played. It has no attributes.

6.3.6 The CLOSE action
The close action tells the Smart Client to close the application. It has no attributes.

6.3.7 The ALERT action
The alert action tells the Smart Client to display an alert item (e.g., a message box on Windows, an alert box on the RIM pager, an alert card on WAP). It has the following attributes;

| Attribute | Optional? | Description |
|---|---|---|
| CAPTION | Yes | The caption to display in the title bar of the message box |
| TEXT | Yes | The text to display in the message box |

6.3.8 The INTEGRATION action
The integration action tells the Smart Client to pass data to an interface exposed on a device. For example a COM interface on Pocket PC. This action will allow the developer to pass a parameter into an exposed method and then also save the result of that method in a global scratchpad value. The contents of the integration action's element are the input values to be passed to the interface. It has the following attributes;

| Attribute | Optional? | Description |
|---|---|---|
| CLSID | No | This is the class identifier of the component that is to be called. |
| SAVE | No | This tells the smart client if it should save the result into a global scratchpad value or not. |
| SAVENAME | Yes | This is the name of the global scratchpad value |

Example ARML:

FIG. 17WW

Appendix "A"

```
<ACTION TYPE="INTEGRATION" CLSID="AirixSignature.AirixSignatureCtrl"
SAVENAME="" SAVE="FALSE">[SP.*.SIGNATURE]</ACTION>
```

6.3.9 The CLOSESCREEN action
The close screen action tells the Smart Client to close all open instances of the screen specified by name in the NAME attribute. This action has the following attributes:

| Attribute | Optional? | Description |
|---|---|---|
| NAME | No | Name of the screen to close. |

6.3.10 The REFRESH action
The refresh action tells the Smart Client to re-run any queries and re-initialize all UI elements on the screen with the name specified by the NAME attribute. If there are multiple open instances of the screen, all open instances will be refreshed. The refresh action has the following attributes:

| Attribute | Optional? | Description |
|---|---|---|
| NAME | No | Name of the screen to refresh. |

6.3.11 The SAVEITEM action
The saveitem action tells the Smart Client to create a new scratchpad item or to edit an existing scratchpad item. The value of the scratchpad item is defined within the <ACTION>...</ACTION> tags. The saveitem action has the following attributes:

| Attribute | Optional? | Description |
|---|---|---|
| SPN | No | Name of the scratchpad item to create or modify. |

6.3.12 The IF Action
This action will contain two lists of actions. One a list of actions to perform if the condition evaluates to TRUE (IFLIST), and another list of actions to perform if the condition evaluates to FALSE (ELSEIFLIST).

The structure of the action is as follows:
```
<ACTION TYPE="IF>
        <COND EVAL="parameter" TYPE="condition type" VALUE="literal">
        </COND>
        <IFLIST>
```

FIG. 17XX

Appendix "A"

```
        <ACTION></ACTION>
    </IFLIST>
    <ELSEIFLIST>
        <ACTION></ACTION>
    </ELSEIFLIST>
</ACTION>
```

6.3.12.1 Conditions (COND)

Conditions are used in conjunction with the IF Action. Conditions are specified as follows:

| Attribute | Optional? | Description |
|---|---|---|
| EVAL | NO | Specifies the parameter to be evaluated. Can be hard coded, scratchpad, or query values. It is the "input" to the function. |
| TYPE | NO | Specifies the type of the condition. Possible values are:<br>LESSTHAN<br>MORETHAN<br>EQUALS<br>ISNUMERIC<br>ISALPHA<br>ISEMAIL<br>ISFORMAT<br>MAXCHARS<br>MINCHARS |
| VALUE | Depends on TYPE | The value that EVAL will be evaluated against. Not relevant for all conditions. |

The following is a description of each of the supported conditions:
- EQUALS, this function will take an input and a value to evaluate the input against. If the two items are determined to be Equal, the condition will return true. If they are not equal, the condition will return false. The value and the input must be of the same data type, otherwise the condition will return false. Memo values will be treated as a string and auto-increment types will be treated as integers. The following criteria will be used to determine equality:
    - Two strings are equal if each of the characters in the strings is identical and the strings have the same number of characters. The string comparison will not be case sensitive.
    - Two integers are equal if their values are mathematically equal.
- MORETHAN, this function will take an input and a value to evaluate the input against. If the input is determined to be greater in value than the evaluation

FIG. 17YY

Appendix "A"

value, the condition will return true. If the values are equal, false is returned. If the evaluation value is determined to be greater than the input, the function will return false. The evaluation value and the input must be of the same data type, otherwise an error condition will occur. Memo values will be treated as a string and the auto-increment type will be treated as an integer. The following criteria will be used to determine which value is greater:
  - String A is more in value than String B if String A occurs before String B in alphabetical order.
  - Integer A is greater than Integer B if A > B, mathematically.
- LESSTHAN, this function will take an input and a value to evaluate the input against. If the input is determined to be lesser in value than the evaluation value, the condition will return true. If the values are equal, false is returned. If the evaluation value is determined to be lesser than the input, the function will return false. The evaluation value and the input must be of the same data type, otherwise an error condition will occur. Memo values will be treated as a string and the auto-increment type will be treated as an integer. The following criteria will be used to determine which value is greater:
  - String A is lesser in value than String B if String A occurs after String B in alphabetical order.
  - Integer A is greater than Integer B if A < B, mathematically.
- ISNUMERIC, this function will take an input and evaluate whether or not it is a value number. If the input can be converted successfully to a number, the function will return true. If the input cannot be converted to a number, the function will return false. All input values will be treated as a string data type.
- ISALPHA, this function will take an input and evaluate whether or not it contains only alphabetic characters. Alphabetic characters are defined as all characters from A-Z, a-z,, and spaces. All input values will be treated as a string data type.
- ISEMAIL, this function will take an input and evaluate whether or not it contains a string of the form *something@something*. All input values will be treated as a string data type.
- ISFORMAT, this function will take an input and a value to evaluate the input against. If the input is determined to be formatted as the evaluation value, the condition will return true. If the evaluation value is determined to be formatted differently than the input, the function will return false. The evaluation value must comply with the ARML formatting standards.

FIG. 17ZZ

Appendix "A"

- MAXCHARS, this function will take an input and evaluate whether or not the number of characters in the string is less than or equal to the evaluation value passed into the function. If the number of characters in the string is less than or equal to the evaluation value, true is returned. If the number of characters in the string is greater than the evaluation value, false is returned. All input values will be treated as a string data type.
- MINCHARS, this function will take an input and evaluate whether or not the number of characters in the string is greater than or equal to the evaluation value passed into the function. If the number of characters in the string is greater than or equal to the evaluation value, true is returned. If the number of characters in the string is less than the evaluation value, false is returned. All input values will be treated as a string data type.

Example:
```
<ACTION TYPE="IF">
        <COND EVAL="[QUERY1.STRREAD]" TYPE="EQUALS" VALUE="READ"></COND>
        <IFLIST>
                <ACTION TYPE="SAVE"></ACTION>
                <ACTION TYPE="OPEN" NAME="INBOX" NEWINST="FALSE"></ACTION>
        </IFLIST>
        <ELSELIST>
                <ACTION TYPE="OPEN" NAME="MSGREAD"
NEWINST="FALSE"></ACTION>
        </ELSELIST>
</ACTION>
```

FIG. 17AAA

Appendix "A"

Example of airix event model

The following example serves to illustrate how a screen is used to compose a data package to be sent back to the AIRIX server. The example used is a screen giving the bare functionality for composing a basic email message – to simplify the example, the user cannot cancel the action, and multiple recipients are not allowed.

```
<ARML>
    <SCREEN NAME="NewMsg">
        <BUTTONS>
            <BTN NAME="OK" CAPTION="Send" INDEX="0">
                <EVENTS>
                    <EVENT TYPE="MODIFY">
                        <ACTION TYPE="ARML">
                            <ARMLTEXT>
                                <BODY TYPE="ME">
                                    <ME MSGID="1" FROM="Tim Neil"
                                        SUBJECT="[SP.NewMsg.Subject]">
                                        <DATA>[SP.NewMsg.Body]</DATA>
                                        <RECIPS>
                                            <RCP MSGID="1"
                                                TO="[SP.NewMsg.To]"></RCP>
                                        </RECIPS>
                                    </ME>
                                </BODY>
                            </ARMLTEXT>
                        </ACTION>
                    </EVENT>
                </EVENTS>
            </BTN>
        </BUTTONS>
        <EDITBOXES>
            <EB NAME="To" INDEX="1"></EB>
            <EB NAME="Subject" INDEX="2"></EB>
            <EB NAME="Body" INDEX="3"></EB>
        </EDITBOXES>
    </SCREEN>
</ARML>
```

The Editboxes section at the bottom defines 3 editboxes, with the names of 'To', 'Subject', and 'Body';

```
<EB NAME="To" INDEX="1"></EB>
<EB NAME="Subject" INDEX="2"></EB>
<EB NAME="Body" INDEX="3"></EB>
```

FIG. 17BBB

Appendix "A"

There is one button on the screen, with the name of 'OK';

```
<BTN NAME="OK" CAPTION="Send" INDEX="0">
```

When the user clicks on OK, the button composes an ARML package to be sent to the AIRIX server;

```
<EVENT>
    <ACTION TYPE="ARML">
```

The ARML package sent is an 'ME' package as described in the example in section 4.2.1. It is composed as follows;

```
<BODY TYPE="ME">
    <ME MSGID="1" FROM="Tim Neil"
        SUBJECT="[SP.NewMsg.Subject]">
        <DATA>[SP.NewMsg.Body]</DATA>
        <RECIPS>
            <RCP MSGID="1" TO="[SP.NewMsg.To]"></RCP>
        </RECIPS>
    </ME>
</BODY>
```

The subject field is taken from the edit box named 'Subject';

```
<ME MSGID="1" FROM="Tim Neil" SUBJECT="[SP.NewMsg.Subject]">
```

The recipients field is taken from the edit box named 'Subject';

```
<RECIPS>
    <RCP MSGID="1" TO="[SP.NewMsg.To]"></RCP>
</RECIPS>
```

Finally the text of the message is filled from the 'Body' field;

```
<DATA>[SP.NewMsg.Body]</DATA>
```

FIG. 17CCC

Appendix "A"

7 AVM-server system interactions

This section describes the primitives that are used for system-level interactions that the AIRIX Smart Client has with the AIRIX server.

7.1 General

7.1.1 Description

System level packages are sent between AIRIX and the AVM (wirelessly).

7.1.2 Structure

System interactions are performed by exchanging ARML data packages with the following structure;

```
<ARML>
<HEAD>...</HEAD>
<SYS>
{data}
</SYS>
</ARML>
```

7.1.3 Tags

7.1.3.1 The <HEAD> tag

The package header is delimited by the <HEAD>...</HEAD> tags. Contained in text between the two tags is the id of the destination mobile. The HEAD tag has the following attributes;

| Attribute | Optional? | Description |
| --- | --- | --- |
| DT | No | The date & time in RFC 1123 format (including time zone) |
| ID | No | A unique ID for the message |
| VERSION | No | The version number of the application (currently "2.0") |
| APPNAME | No | The application name ("0" for System Messages) |
| DEVICE | No | A numeric constant identifying the device |
| PID | Yes | A unique value used to designate a device. |
| AVMV | No | The version number of the Smart Client. |

7.1.3.2 The <SYS> tag

The <SYS>...</SYS> pair contains the actual system package. The tag does not have any attributes.

FIG. 17DDD

Appendix "A"

7.2 Device Registration & deregistration package

7.2.1 Description
Device registration packages are sent from the AVM to the AIRIX server when a user registers their device.

7.2.2 Structure
A device registration package has the following structure;

```
{wrapper tags}
<REG>
        <USERNAME> {data} </USERNAME>
        <PASSWORD> {data} </PASSWORD>
</REG>
{wrapper tags}
```

7.2.3 Tags

7.2.3.1 The <REG> tag

The <REG>...</REG> pair delimit the registration request. The tag has no attributes.

7.2.3.2 The <USERNAME> tag

The <USERNAME>...</ USERNAME > pair contain the user name. The tag does not have any attributes.

7.2.3.3 The <PASSWORD> tag

The <PASSWORD>...</PASSWORD> pair contain the password. The tag does not have any attributes.

7.2.4 Example
This package would be sent by a user, to register their device under a given name;

```
{wrapper tags}
<REG>
        <USERNAME>SUNTRESS</USERNAME>
        <PASSWORD>MYPASS</PASSWORD>
</REG>
{wrapper tags}
```

FIG. 17EEE

Appendix "A"

7.3 Registration confirmation package

7.3.1 Description

This packages is sent back from the AIRIX server to the AVM to confirm that the device has been registered.

7.3.2 Structure

A registration confirmation package has the following structure;

```
{wrapper tags}
<REGCONFIRM>
      <VALUE> {data} </VALUE>
      <APPS>
            <APP></APP>
            <APP></APP>
      </APPS>
</REGCONFIRM>
{wrapper tags}
```

7.3.3 Tags

7.3.3.1 The <REGCONFIRM> tag

The <REGCONFIRM>...</REGCONFIRM> pair delimit the confirmation. The tag has no attributes.

7.3.3.2 The <VALUE> tag

The <VALUE>...</VALUE> pair contains the status of the registration request. The following text strings are allowable;

CONFIRM – this means that the registration request was successful
NOTREGPLATFORM – this means that the registration request failed because the device is not registered for the platform
INVALIDUSERPASS – this means that the registration request failed because the user name or password was not valid
NODEVICE – this means that the registration request failed because the device was not registered previously by an application

7.3.3.3 The <APPS> tag

The <APPS>...</APPS> pair contains a list of applications for the device.

FIG. 17FFF

Appendix "A"

7.3.3.4 The <APP> tag

The <APP>...</APP> pair contains an application header. It has the following attributes;

| Attribute | Optional? | Description |
|---|---|---|
| ID | No | The application ID |
| NAME | No | The name of the application |
| DESCRIPTION | No | A text description of the application |
| REG | No | 'YES' if the user is registered for this application. 'NO' if they are not. |

7.3.4 Example

This package would be sent to confirm the example request in section 7.2.4;

```
{wrapper tags}
<REGCONFIRM>
        <VALUE>CONFIRM</VALUE>
        <APPS>
            <APP ID="4" NAME="EMAIL" DESCRIPTION="E-Mail Application" REG="YES">
            <APP ID="22" NAME="STOCKS" DESCRIPTION="Stock Quotes" REG="NO">
        </APPS>
</REGCONFIRM>
{wrapper tags}
```

FIG. 17GGG

Appendix "A"

7.4 Find applications package

7.4.1 Description
Find applications packages are sent from the AIRIX component to the AIRIX server when a user wishes to refresh their list of applications on a device

7.4.2 Structure
A device registration package has the following structure;

```
{wrapper tags}
<FINDAPPS>
</FINDAPPS>
{wrapper tags}
```

7.4.3 Tags

7.4.3.1 The <FINDAPPS> tag
The <FINDAPPS>...</FINDAPPS> pair delimit the application registration request. It has no attributes.

FIG. 17HHH

Appendix "A"

7.5 Find applications confirmation package

7.5.1 Description
This package is sent back from the AIRIX server to the AVM to and contains a list of applications available for the user

7.5.2 Structure
A registration confirmation package has the following structure;

```
{wrapper tags}
<FINDAPPSCONFIRM>
        <APPS>
                <APP></APP>
                <APP></APP>
        </APPS>
</FINDAPPSCONFIRM>
{wrapper tags}
```

7.5.3 Tags

7.5.3.1 The <FINDAPPSCONFIRM> tag
The <FINDAPPSCONFIRM>...</FINDAPPSCONFIRM> pair delimit the confirmation. The tag has no attributes.

7.5.3.2 The <APPS> tag
The <APPS>...</APPS> pair contains a list of applications for the device.

7.5.3.3 The <APP> tag
The <APP>...</APP> pair contains an application header. It has the following attributes;

| Attribute | Optional? | Description |
| --- | --- | --- |
| ID | No | The application ID |
| NAME | No | The name of the application |
| DESCRIPTION | No | A text description of the application |
| REG | No | 'YES' if the user is registered for the application. 'NO' if they are not. |

FIG. 17III

Appendix "A"

7.6 Application Registration & deregistration package

7.6.1 Description

Application registration packages are sent from the AIRIX component to the AIRIX server when a user wishes to register or deregister for an application.

7.6.2 Structure

A device registration package has the following structure;

```
{wrapper tags}
<APPREG>
</APPREG>
{wrapper tags}
```

7.6.3 Tags

7.6.3.1 The <APPREG> tag

The <APPREG>...</APPREG> pair delimit the application registration request. The tag has the following attributes;

| Attribute | Optional? | Description |
|---|---|---|
| TYPE | No | This defines the type of parameter. It can take two values; ADD – this means that the application is to be added to the registration database DELETE – this means that the application is to be removed to the registration database |
| ID | No | The ID of the application being registered/deregistered |

FIG. 17JJJ

Appendix "A"

7.7 Application registration & deregistration confirmation package

7.7.1 Description

This packages is sent back from the AIRIX server to the AVM to confirm that the applicaiton has been registered or deregistered.

7.7.2 Structure

A registration confirmation package has the following structure (note that for DELETE types, the <INTERFACE>...</INTERFACE> section will not be included);

```
{wrapper tags}
<APPREGCONFIRM>
    <INTERFACE>
        interface definition
    </INTERFACE>
</APPREGCONFIRM>
{wrapper tags}
```

7.7.3 Tags

7.7.3.1 The <APPREGCONFIRM> tag

The <APPREGCONFIRM>...</APPREGCONFIRM> pair delimit the confirmation. The tag has the following attributes;

| Attribute | Optional? | Description |
| --- | --- | --- |
| TYPE | No | This defines the type of parameter. It can take two values; ADD – this means that the application is to be added to the registration database DELETE – this means that the application is to be removed to the registration database |
| ID | Yes | The ID of the application being returned (if any) |

7.7.3.2 The <INTERFACE> tag

The <INTERFACE>...</INTERFACE> pair delimit the interface definition. The tag has the no attributes, and contains an interface definition as laid out in section 3. Note that instead of the <DEVICES>...</DEVICES> tags in section 3.1.3.6, it will be replaced by <SCREENS>...<SCREENS> with the screen definitions for only the one device that the interface is being sent to (see section 3.4.3.2 for the definition of the

FIG. 17KKK

Appendix "A"

<SCREENS> tag). This section will not be sent for APPREGCONFIRM messages of TYPE="DELETE".

7.7.4 Example
The following example shows the application confirmation with screen definitions for an application that allows a user to view their inbox and the mails in it.

```
{wrapper tags}
<APPREGCONFIRM TYPE="ADD" ID="12">
    <INTERFACE>
        <AXSCHDEF>
            <EVENTS>
                <EVENT>
                    (action definitions)
                </EVENT>
            </EVENTS>
            <AXTDEFS>
                (table definitions)
            </AXTDEFS>
            <DPACKETS>
                (data package definitions)
            </DPACKETS>

<SCREENS>
                <SCREEN NAME="INBOX ">
                    (screen definition)
                </SCREEN>
                <SCREEN NAME="VIEWNEWMAIL">
                    (screen definition)
                </SCREEN>
            </SCREENS>
        </AXSCHDEF>
    </INTERFACE>
</APPREGCONFIRM>
{wrapper tags}
```

FIG. 17LLL

Appendix "A"

7.8 Setting the active device package

7.8.1 Description
If a user wishes to set the current device as their active device, the AVM must send a 'set active device' package to the AIRIX server

7.8.2 Structure
A 'set active device' package has the following structure;

```
{wrapper tags}
<SA>
{data}
</SA>
{wrapper tags}
```

7.8.3 Tags

7.8.3.1 The <SA> tag
The 'set active device' package is shown by the <SA>...</SA> tags. The tag has no attributes; the tag pair contains the user's username

7.8.4 Example
This package would be sent by a user with the username of 'scotty';

```
{wrapper tags}
<SA>scotty</SA>
{wrapper tags}
```

7.9 Set active device response

7.9.1 Description
This packages is sent back from the AIRIX server to the client in response to a request to set the current device as the active one.

7.9.2 Structure
A 'set active device response' package has the following structure;

```
{wrapper tags}
<SACONFIRM>
        <VALUE> {data} </VALUE>
</SACONFIRM>
```

FIG. 17MMM

Appendix "A"

{wrapper tags}

7.9.3 Tags

7.9.3.1 The <SACONFIRM> tag
The <SACONFIRM>...</SACONFIRM> pair delimit the confirmation. The tag does not have any attributes.

7.9.3.2 The <VALUE> tag
The <VALUE>...</VALUE> pair contains the status of the registration request. The following text strings are allowable;

CONFIRM – this means that the registration request was successful
NOTREGISTERED – this means that the registration request failed because

7.9.4 Example
This package would be sent by the AIRIX server to confirm a set active request;

```
{wrapper tags}
<SACONFIRM>
        <VALUE>CONFIRM</VALUE>
</SACONFIRM>
{wrapper tags}
```

7.10 Invalid Application package

7.10.1 Description
This package is sent back from the AIRIX server to the AVM in response to a request to interact with an application that is no longer registered with AIRIX.

7.10.2 Structure
An 'invalid application' package has the following structure;

```
{wrapper tags}
<NOAPP>
        <VALUE> {data} </VALUE>
</NOAPP>
{wrapper tags}
```

FIG. 17NNN

Appendix "A"

7.10.3 Tags

7.10.3.1 The <NOAPP> tag

The <NOAPP>...</NOAPP> pair delimit the confirmation. The tag has no attributes.

7.10.3.2 The <VALUE> tag

The <VALUE>...</VALUE> pair delimit the return code. It can only be NOAPPLICATION – Application not found.

7.10.4 Example

This package would be sent in response to a request if the application cannot be found;

```
{wrapper tags}
<NOAPP>
        <VALUE>NOAPPLICATION</VALUE>
</NOAPP>
{wrapper tags}
```

FIG. 17000

Appendix "A"

8 Application-server system interactions

The section that defines Application to server system interactions has been made obsolete by the document "AIRIX Polling XML Language Specification". It describes an XML-HTTP interface to AIRIX using POST and GET commands to a web-based ISAPI DLL.

FIG. 17PPP

MOBILE DEVICE HAVING EXTENSIBLE SOFTWARE FOR PRESENTING SERVER-SIDE APPLICATIONS, SOFTWARE AND METHODS

COPYRIGHT NOTICE

A portion of the disclosure of this patent document contains material which is subject to copyright protection. The copyright owner has no objection to the facsimile reproduction by any one of the patent document or patent disclosure, as it appears in a Patent Office patent file or records, but otherwise reserves all copyright rights whatsoever.

FIELD OF THE INVENTION

The present invention relates to software, devices and methods allowing varied mobile devices to interact with server side software applications.

BACKGROUND OF THE INVENTION

Wireless connectivity is a feature of the modern telecommunications environment. An increasing range of people are using a wide variety of wireless data networks to access corporate data applications.

However, there are numerous competing mobile devices that can be used to achieve this. Each device has its own operating system and its own display characteristics. Operating systems are not mutually compatible, nor are the display characteristics—some are color, some are black and white, some are text-only, some are pictorial.

At the same time, an increasing number of mobile device users are people without a technical background or high level of educational achievement. Such people are often intimidated by the need to run complex installation programs. Furthermore, at present, such installation programs generally depend on cable connections to a personal computer by the means of a 'cradle' or other such device.

U.S. Patent Publication No. US 2003/0060896 discloses a mechanism allowing server-side applications to be presented at multiple wireless devices with minimal modification of the application at the server. As disclosed, how an application is presented at a mobile device is defined by a text based application definition file. The definition file describes how an application is to be presented at the mobile device; the format of transactions over the wireless network; and a format of data related to the application to be stored at the mobile device. A virtual machine software component at the mobile device interprets the definition file and presents an interface to the application in accordance with the definition file. Conveniently, the application definition file may be independent of the particular type of mobile device, while virtual machine software components specific to the mobile device may be created.

This approach, while flexible in many ways, is somewhat limited. For example, how an application may be presented at the mobile device, and what resources of the mobile device may be used is limited by the nature of the virtual machine software at the device. The virtual machine software component is typically written with a specific mobile device with specific hardware in mind. As the mobile device is expanded to, for example, include new hardware or local software applications the server side application can typically not take advantages of the new hardware and software. Of course, the virtual machine software component could be rewritten (or recompiled). This, however, is cumbersome and would require many versions of virtual machine software specific to many different hardware configurations.

Accordingly, there is a need for virtual machine software that is extensible.

SUMMARY OF THE INVENTION

In accordance with the present invention, data from an application executing at a computing device is presented at a remote wireless device, by providing the device an application definition file, containing a definition of a user interface for the application at the mobile device. Based on the definition file, the wireless device may receive data from the application and present an interface for the application. Virtual machine software at the mobile device interprets the application definition file. This virtual machine software is extensible to takes advantage of other software and/or hardware at the device.

Preferably, the application definition file is an XML file. Similarly, application specific network messages provided to the device are also formed using XML. Specific XML tags are used to execute software at the mobile device, but external to the virtual machine software. In particular, object classes external to the virtual machine may be instantiated and their methods performed.

In accordance with an aspect of the present invention, a method of presenting data from an application executing at a computing device at a wireless mobile device remote from the computing device, includes receiving at the mobile device, a representation of a text file defining a user interface and actions to be taken in response to user interaction with the user interface or received data from the application; receiving data from the application; executing virtual machine software at the mobile device to present the user interface and the received data, in accordance with the text file; wherein at least one of the actions in the text file specifies execution of a software component separate from the virtual machine software, identified in the text file and loaded at the device; and executing the software component at the device in response to the at least one of the actions.

In accordance with another aspect of the present invention wireless mobile device comprising a processor; computer readable memory in communication with the processor, storing virtual machine software controlling operation of the wireless mobile device, the virtual machine software including, a parser for receiving a text file; a screen generation engine, for presenting at least one screen at the wireless mobile device in accordance with the text file; an event handler for processing events arising in response to interaction with the at least one screen in accordance with the text file, the event handler operable to execute a software component separate from the virtual machine software, identified in the text file and loaded at the device.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention, FIG. 1 schematically illustrates a mobile device, exemplary of an embodiment of the present invention, including virtual machine software, further exemplary of an embodiment of the present invention;

FIG. 12 illustrates the format of messages exchanged in the message flow of FIG. 7;

FIGS. 14, 15 and 16A-16B illustrate a sample portion of an application definition file defining a user interface illustrated in FIG. 13; and FIGS. 17A-17PPP contain Appendix "A" detailing example XML entities understood by the virtual machine software of the mobile device of FIG. 1.

DETAILED DESCRIPTION

Figure 1:
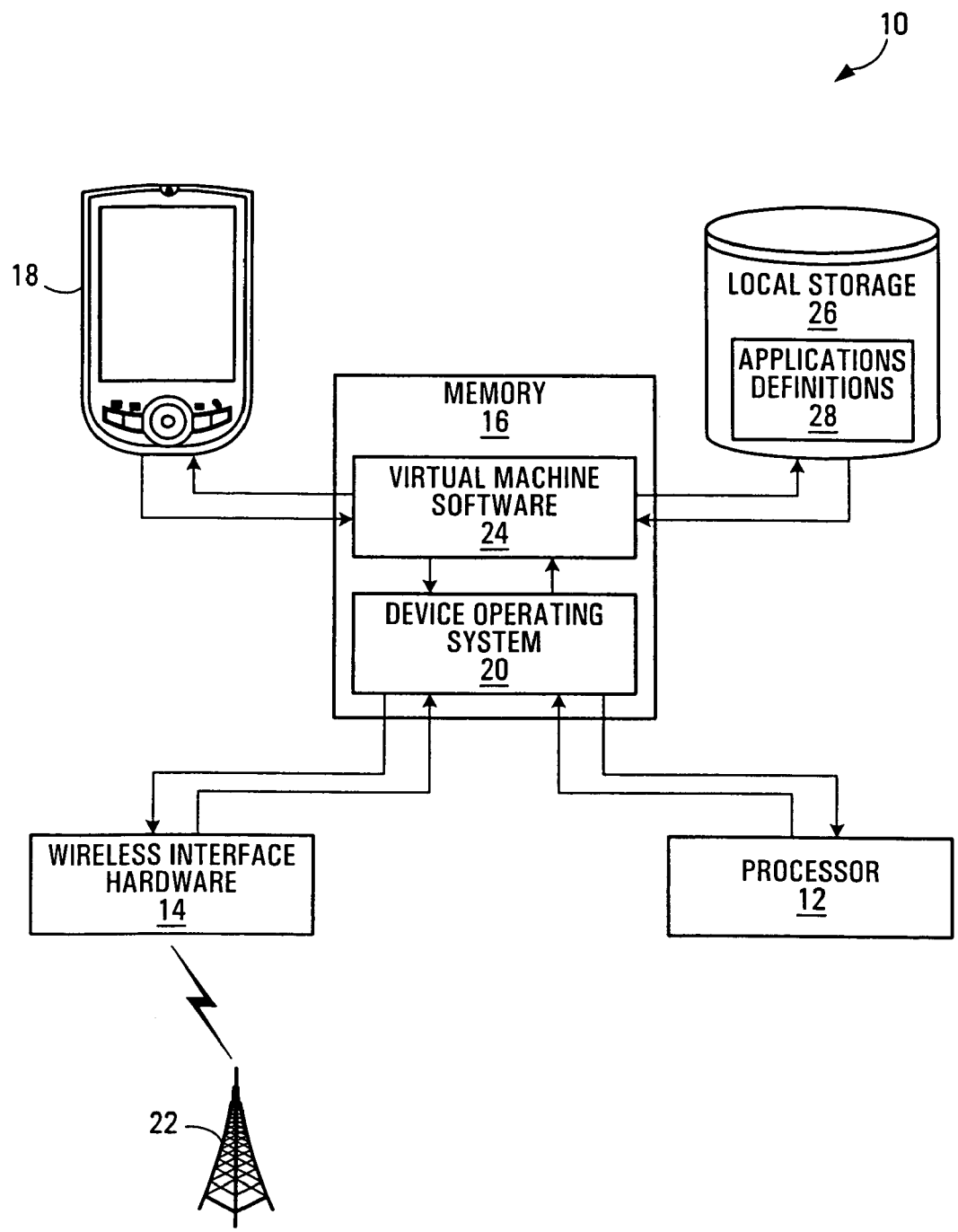

FIG. 1 illustrates a mobile device 10, exemplary of an embodiment of the present invention. Mobile device 10 may be any conventional mobile device, modified to function in manners exemplary of the present invention. As such, mobile device 10 includes a processor 12, in communication with a network interface 14, storage memory 16, and a user interface 18 typically including a keypad and/or touch-screen. Network interface 14 enables device 10 to transmit and receive data over a wireless network 22. Mobile device 10 may be, for example, be a Research in Motion (RIM) two-way paging device, a WinCE based device, a PalmOS device, a WAP enabled mobile telephone, or the like. Memory 16 of device 10 stores a mobile operating system such as the PalmOS, or WinCE operating system software 20. Operating system software 20 typically includes graphical user interface and network interface software having suitable application programmer interfaces ("API"s) for use by other applications executing at device 10.

Memory at device 10 further stores virtual machine software 24, exemplary of an embodiment of the present invention. Virtual machine software 24, when executed by mobile device 10 enables device 10 to present an interface for server side applications provided by a middleware server, described below. Specifically, virtual machine software 24 interprets a text application definition file defining a user interface 18 controlling application functionality, and the display format (including display flow) at device 10 for a particular server-side application; the format of data to be exchanged over the wireless network for the application; and the format of data to be stored locally at device 10 for the application. Virtual machine software 24 uses operating system software 20 and associated APIs to interact with device 10, in accordance with the received application definition file. In this way, device 10 may present interfaces for a variety of applications, stored at a server. From the perspective of operating system software 20, virtual machine software 24 is viewed as another application resident at device 10. Moreover, multiple wireless devices each having a similar virtual machine software 24 may use a common server side application in combination with an application definition, to present a user interface and program flow specifically adapted for the device.

As such, and as will become apparent, the exemplary virtual machine software 24 is specifically adapted to work with the particular mobile device 10. Thus if device 10 is a RIM Blackberry device, virtual machine software 24 is a RIM virtual machine. Similarly, if device 10 is a PalmOS or WinCE device, virtual machine software 24 would be a PalmOS or a WinCE virtual machine. As further illustrated in FIG. 1, virtual machine software 24 is capable of accessing local storage 26 at device 10.

Other applications, libraries, and software may also be present within memory 16 or local storage 26, and are not specifically illustrated. For example, device 10 may store and execute personal information management (PIM) software, including calendar and contact management applications. Similarly, device 10 could store and execute software allowing device 10 to perform a number of functions. Software could, for example, interact with the hardware at device 10 to allow device 10 to act as a multimedia player; allowing device 10 to print; allowing device 10 to interact with other incorporated hardware not specifically illustrated, including but not limited to a Bluetooth interface; a Global Positioning Satellite (GPS) Receiver; and the like. In the depicted embodiment, however, memory 16 stores software components in the form of object classes 29 that may be used to extend the functionality of virtual machine software 24. As will become apparent these external software components in the form of object classes 29 allow virtual machine software 24 to become extensible. Object classes 29 may, for example, allow virtual machine software to access additional hardware or software local to device 10.

As detailed below, an exemplary application definition file may be formed using a mark-up language, like XML. In accordance with an embodiment of the present invention, defined XML entities are understood by the virtual machine software 24. Defined XML entities are detailed in Appendix "A", hereto and Appendix "A" of U.S. Patent Publication 2003/0060896. The defined XML entities are interpreted by the virtual machine software 24, and may be used as building blocks to present server-side applications at mobile device 10, as detailed herein.

Figure 2:
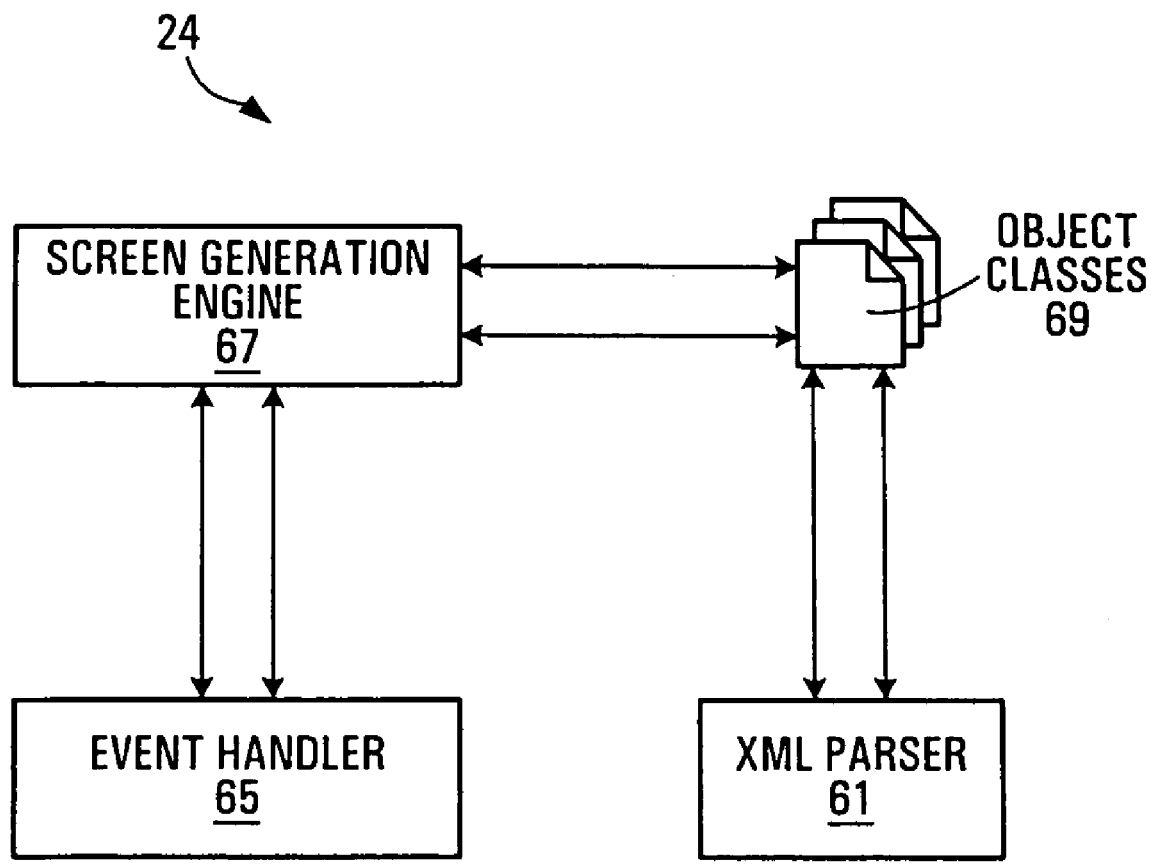
FIG. 2 further illustrates the organization of exemplary virtual machine software at the mobile device of FIG. 1.

Specifically, as illustrated in FIG. 2, virtual machine software 24 includes a conventional XML parser 61; an event handler 65; a screen generation engine 67; and object classes 69 corresponding to XML entities supported by the virtual machine software 24, and possibly contained within an application definition 28. Supported XML entities are detailed in Appendix "A" hereto. A person of ordinary skill will readily appreciate that those XML entities identified in Appendix "A" are exemplary only, and may be extended, or shortened as desired.

XML parser 61 may be formed in accordance with the Document Object Model, or DOM, available at http://www.w3.org/DOM/, the contents of which are hereby incorporated by reference. Parser 61 enables virtual machine software 24 to read an application definition file. Using the parser, the virtual machine software 24 may form a binary representation of the application definition file for storage at the mobile device, thereby eliminating the need to parse text each time an application is used. Parser 61 may convert each XML tag contained in the application definition file, and its associated data to tokens, for later processing. As will become apparent, this may avoid the need to repeatedly parse the text of an application definition file.

Screen generation engine 67 displays initial and subsequent screens at the mobile device, in accordance with an application definition 28, as detailed below.

Event handler 65 of virtual machine software 24 allows device 10 under control of virtual machine software 24 to react to certain external events. Example events include user interaction with presented screens or display elements, incoming messages received from a wireless network, or the like.

Object classes 69 also form part of virtual machine software 24 and define objects that allow device 10 to process each of the supported XML entities at the mobile device. Each of object classes 69 includes attributes used to store parameters defined by the XML file, and functions allowing the XML entity to be processed at the mobile device, as detailed in Appendix "A", for each supported XML entity. So, as should be apparent, supported XML entities are extensible. Virtual machine software 24 may be expanded to support XML entities not detailed in Appendix "A". Corresponding object classes could be added to virtual machine software 24.

As detailed below, upon invocation of a particular application at mobile device 10, the virtual machine software 24 presents an initial screen based on the contents of the application definition 28 for the application. Screen elements are created by screen generation engine 67 by creating instances of corresponding object classes for defined elements, as contained within object classes 69. The object instances are created using attributes contained in the application definition 28. Thereafter the event handler 65 of the virtual machine software 24 reacts to events for the application. Again, the event handler consults the contents of the application definition file for the application in order to properly react to events. Events may be reacted to by creating instances of associated "action" objects, from object classes 69 of virtual machine software 24.

Similarly, object classes 69 of virtual machine software 24 further include object classes corresponding to data tables and network transactions defined in the Table Definition and Package Definition sections of Appendix "A". At run time, instances of object classes corresponding to these classes are created and populated with parameters contained within application definition file, as required.

Using this general description, persons of ordinary skill in the art will be able to form virtual machine software 24 for any particular device. Typically, virtual machine software 24 may be formed using conventional object oriented programming techniques, and existing device libraries and APIs, as to function as detailed herein. As will be appreciated, the particular format of screen generation engine 67, object classes 69 will vary depending on the type of virtual machine software, its operating system and API available at the device. Once formed, a machine executable version of virtual machine software 24 may be loaded and stored at a mobile device, using conventional techniques. It can be embedded in ROM, loaded into RAM over a network, or from a computer readable medium.

As so far described, however, operation of virtual machine software 24 is limited by those object classes 69 forming part of virtual machine software 24. However, exemplary of embodiments of the present invention object classes 29 not forming part of virtual machine software 24, are further loaded within memory 16 of device 10. Conveniently, object classes 29 may be created by a user (or administrator) of device 10 do not rely on access to the source code for virtual machine software 24.

Instead, as will become apparent, virtual machine software 24 includes a software code portion that instantiates identified ones of object classes 29, external to virtual machine software 24 and executes methods contained in the object classes 29. As such, virtual machine software 24 may be extended through the addition of additional object classes.

Although, in the preferred embodiment the virtual machine software 24 and software forming object classes 29 are formed using object oriented structures, persons of ordinary skill will readily appreciate that other approaches could be used to form suitable virtual machine software. For example, object classes 69 forming part of the virtual machine could be replaced by equivalent functions, data structures or subroutines formed using a conventional (i.e. non-object oriented) programming environment. Object classes 29 could be similarly replaced with other software components in the form of libraries, sub-routines, programs, combinations thereof, or the like.

Operation of virtual machine software 24 under control of an application definition containing various XML definitions exemplified in Appendix "A" is further detailed below.

Figure 3:
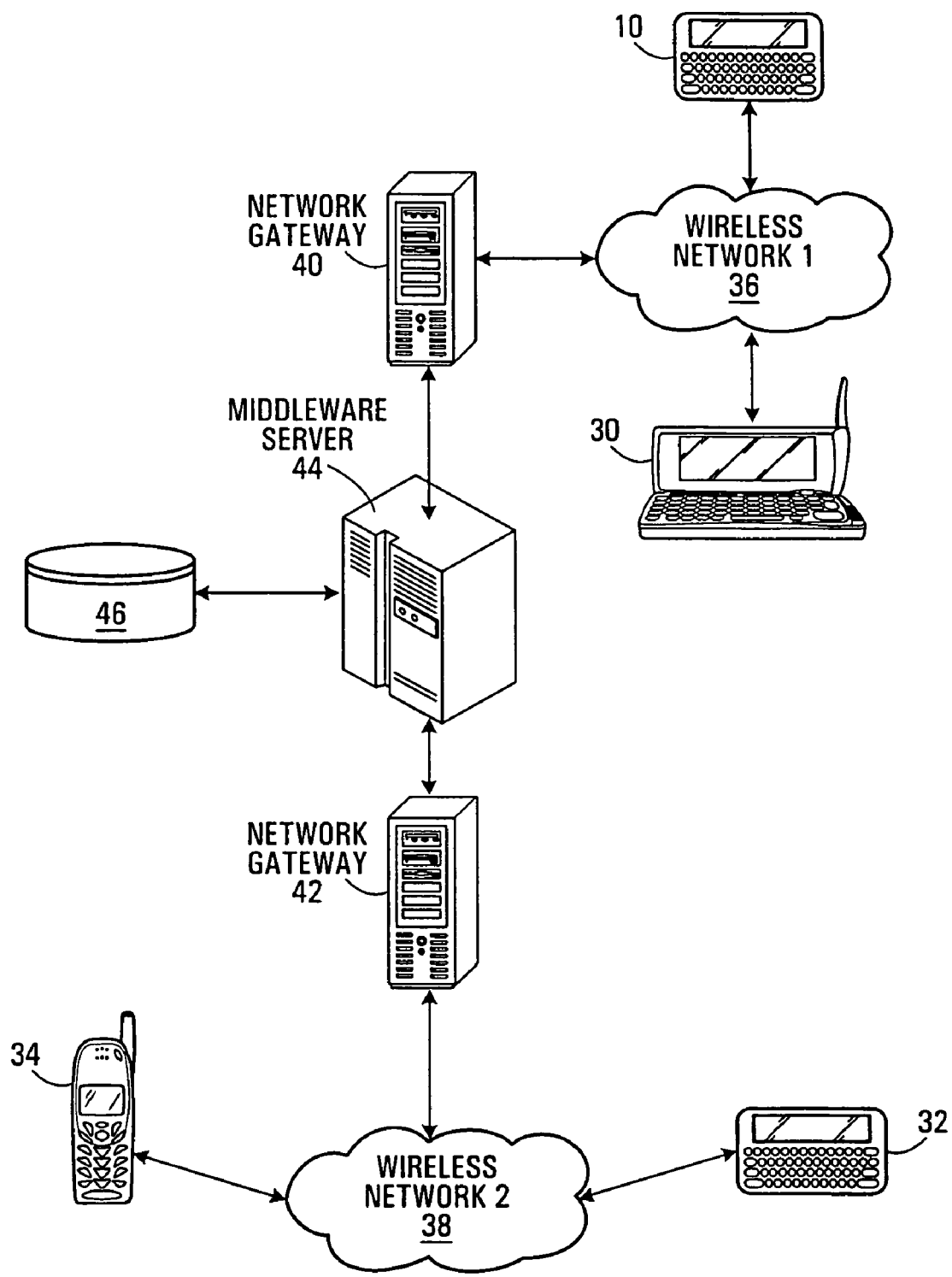
FIG. 3 illustrates an operating environment for the device of FIG. 1.

FIG. 3 illustrates the operating environment for a mobile device 10. Further example mobile devices 30, 32 and 34 are also illustrated in FIG. 3. These mobile devices 30, 32 and 34 are similar to device 10 and also store and execute virtual machine software exemplary of an embodiment of the present invention.

Virtual machine software like that stored at device 10, executes on each mobile device 10, 30, 32, 34, and communicates with a middleware server 44 by way of example wireless networks 36 and 38 and network gateways 40 and 42. Example gateways 40 and 42 are generally available as a service for those people wishing to have data access to wireless networks. An example network gateway is available from Broadbeam Corporation in association with the trademark SystemsGo!. Wireless networks 36 and 38 are further connected to one or more computer data networks, such as the Internet and/or private data networks by way of gateway 40 or 42. As will be appreciated, the invention may work with many types of wireless networks. Middleware server 44 is in turn in communication with a data network, that is in communication with wireless network 36 and 38. The communication used for such communication is via TCP/IP over an HTTP, COM or .NET transport. As could be appreciated, other network protocols such as X.25 or SNA could equally be used for this purpose.

Devices 10, 30, 32, and 34 communicate with middleware server 44 in two ways. First, virtual machine software 24 at each device may query middleware server 44 for a list of applications that a user of an associated mobile device 10, 30, 32 or 34 can make use of. If a user decides to use a particular application, device 10, 30, 32 or 34 can download a text description, in the form of an application definition file, for the application from the middleware server 44 over its wireless interface. As noted, the text description is preferably formatted using XML. Second, virtual machine software 24 may send, receive, present, and locally store data related to the execution of applications, or its own internal operations. The format of exchanged data for each application is defined by an associated application definition file. Again, the exchanged data is formatted using XML, in accordance with the application definition file.

Middleware server 44, in turn, stores text application definition files for those applications that have been enabled to work with the various devices 10, 30, 32, and 34 using virtual machine software 24 in a pre-defined format understood by virtual machine software 24. Software providing the functions of the middleware server 44, in the exemplary embodiment is written in C#, using an SQL Server or MySQL database.

As noted, text files defining application definitions and data may be formatted in XML. For example XML version 1.0, detailed in the XML version 1.0 specification third edition, dated Feb. 4, 2004 and available at the internet address "http://www.w3.org/TR/2004/REC-xml-20040204/", the contents of which are hereby incorporated herein by reference, may be used. However, as will be appreciated by those of ordinary skill in the art, the functionality of storing XML description files is not dependent on the use of any given programming language or database system.

Each file containing an application definition 28 is formatted according to defined rules and uses pre-determined XML mark-up tags known by both virtual machine software 24, and complementary middleware server software 68. Tags define XML entities used as building blocks to present an application at a mobile device. Knowledge of these rules, and an understanding of how each tag and section of text should be interpreted, allows virtual machine software 24 to process an XML application definition and thereafter execute an application, as described below. Virtual machine software 24 effectively acts as an interpreter for a given application definition file.

Figure 4:
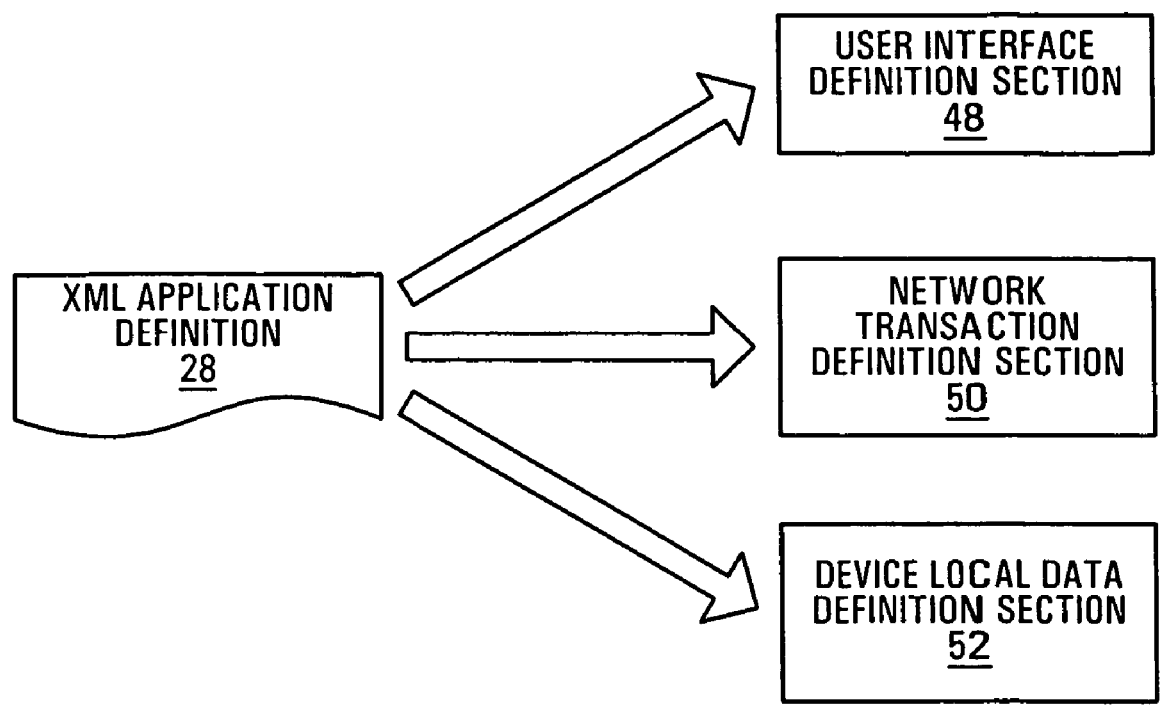
FIG. 4 illustrates the structure of example application definitions stored at a server of FIG. 2 used by the device of FIG. 1.

FIG. 4 illustrates an example format for an XML application definition 28. As illustrated, the example application definition 28 for a given device and application includes three components: a user interface definition section 48, specific to the user interface for the device 10, and defining the format of screen or screens for the application and how the user interacts with them; a network transactions definition section 50 defining the format of data to be exchanged with the application; and a local data definition section 52 defining the format of data to be stored locally on the mobile device by the application.

Defined XML mark-up tags correspond to XML entities supported at a device, and are used to create an application definition 28. The defined tags may broadly be classified into three categories, corresponding to the three sections 48, 50 and 52 of an application definition 28.

Example XML tags and their corresponding significance are detailed in Appendix "A". As noted above, virtual machine software 24 at a mobile device includes object classes corresponding to each of the XML tags. At run time, instances of the objects are created as required.

Broadly, the following example XML tags may be used to define the user interface definition:

SCREEN—this defines a screen. A SCREEN tag pair contains the definitions of the user interface elements (buttons, radio buttons, and the like) and the events associated with the screen and its elements BUTTON—this tag defines a button and its associated attributes LIST—this tag defines a list box CHOICEBOX—this tag defines a choice item, that allows selection of a value from predefined list MENU—the application developer will use this tag to define a menu for a given screen EDITBOX—this tag defines an edit box TEXT ITEM—this tag describes a text label that is displayed CHECKBOX—this tag describes a checkbox HELP—this tag can define a help topic that is used by another element on the screen IMAGE—this tag describes an image that appears on those displays that support images ICON—this tag describes an icon EVENT—this defines an event to be processed by the virtual machine software. Events can be defined against the application as a whole, individual screens or individual items on a given screen. Sample events would be receipt of data over the wireless interface, or a edit of text in an edit box ACTION—this describes a particular action that might be associated with an event handler. Sample actions would be navigating to a new window or displaying a message box.

The second category of example XML tags describes the network transaction section 50 of application definition 28. These may include the following example XML tags;

TABLEUPDATE—using this tag, the application developer can define an update that is performed to a table in the device's local storage. Attributes allow the update to be performed against multiple rows in a given table at once;

PACKAGEFIELD—this tag is used to define a field in a data package that passes over the wireless interface The third category of XML tags used to describe an application are those used to define a logical database that may be stored at the mobile device. The tags available that may be used in this section are:

TABLE—this tag, and its attributes, define a table. Contained within a pair of TABLE tags are definitions of the fields contained in that table. The attributes of a table control such standard relational database functions as the primary key for the table.

FIELD—this tag describes a field and its attributes. Attributes of a field are those found in a standard relational database system, such as the data type, whether the field relates to one in a different table, the need to index the field, and so on.

As well as these XML tags, virtual machine software 24 may, from time to time, need to perform certain administrative functions on behalf of a user. In order to do this, one of object classes 69 has its own repertoire of tags to communicate its needs to the middleware server 44. Such tags differ from the previous three groupings in that they do not form part of an application definition file, but are solely used for administrative communications between the virtual machine software 24 and the middleware server 44. These tags are again detailed in U.S. Patent Publication US 2003/0060896.

One specific type of ACTION understood by virtual machine software 24 is referred to as a "INTEGRATION" action. This action is identified as an ACTION having an ACTION TYPE="INTEGRATION" tag, as more particularly exemplified in FIG. xx.

Specifically, the format of the TYPE tag identifying the INTEGRATION action takes the form <ACTION TYPE="INTEGRATION" CLSID="class_name" SAVENAME="returnvar" SAVE="true/false"> my input text</ACTION>

That is, the INTEGRATION tag takes as arguments, the name of an external one of classes 29 to be instantiated assigned to CLSID=class_name, and the name of a local variable, returnvar, used by virtual machine software 24 in which results passed by the execution should be stored. As well, the value assigned to SAVE is boolean and specifies whether or not the data returned by the instantiated class should be saved.

Notably, class_name identifies one of classes 29 by name. The name of the class is assigned as described below. The name of the local variable corresponds to the name of a variable defined in section 52 of the application definition 28.

Finally, the contents of the ACTION element (i.e. my input text) is passed to the instantiated one of classes 29, as detailed below.

The exact way in which external accessible objects are formed and may be accessed by virtual machine software 24 will typically depend on the operating system software 20 of device 10 in association with which virtual machine software 24 is executing. Virtual machine software 24 should, however, be able to identify the external object and instantiate it. Optionally, virtual machine software 24 should be able to verify that the external object class has an interface that conforms to virtual machine software 24.

For example, virtual machine software 24 written and executing in a WindowsCE environment, object classes developed using the component object model (COM) may be accessible. The component object model (COM) is described at http://msdn.microsoft.com/library/default.asp?url=/library/enus/dnanchor/html/componentobjectmodelanchor.asp and D. Box, Essential COM, (1997: Addison-Wesley Professional) ISBN: 0201634465, the contents of which are hereby incorporated by reference.

Briefly, object classes developed using COM are registered with the WindowsCE operating system. The operating system maintains a list of the COM objects that have been created. Additionally, object classes developed in accordance with the COM include one or more defined interface.

Other operating systems executing on mobile devices expose classes that may be accessible by virtual machine software 24 in different ways. For example, RIM and PalmOS operating systems expose various PIM object stores as Java Classes or C++ classes. A person of ordinary skill will readily appreciate how such classes may be used by virtual machine software 24 created for such an operating system.

Object classes 29 written in accordance with the COM, exemplary of embodiments of the present invention may register their name with the underlying operating system, and further include an interface. In the preferred embodiment, the interface takes has a name known by virtual machine software 24. For example, the interface may take the name IAIRIXIntegrationPoint. In the preferred embodiment the interface defines a function with name HRESULT that takes parameter hWndParent, InputString, and OutputString. Variables InputString, and OutputString are populated by values passed virtual machine software 24 identifying attributes of the string SAVE_NAME.

The value of hWndParent identifies the main window generated by virtual machine software 24 as a result of the application definition file instantiating the object class. The value may be used by the method of the instantiated class 29 to embed controls on or as a parent window to sub windows that the method creates.

To summarize, the interface takes the form

```
interface IAIRIXIntegrationPoint : IDispatch
{
    [id(1), helpstring("method Process")] HRESULT Process(VARIANT
    hWndParent, BSTR InputString, BSTR* OutputString);
};
```

As will be appreciated, IDispatch signifies a standard COM interface; id(1) signifies that the method Process is listed as the first method exposed on the interface; and helpstring may be used by a debugging tool.

The method Process, in turn, performs the function to be implementd by the external object class to perform the desired functionality, extending the functions performed by virtual machine software 24. For example, method "Process" could provide an interface to other object classes, or hardware at device 10. The method "Process" could for example gather a signature, a fingerprint, GPS co-ordinates, or virtually any other function that can be performed by device 10. Conveniently, the method "Process" may make use of the string data contained as my input text and forming part of the XML element giving rise to the instantiating of the class.

Upon completion of the method, results should be formatted by the method and placed in the variable OutputString, so the results may be passed back to virtual machine software 24 for further processing. In the exemplary embodiment, the content of OutputString is XML formatted, so that it may be easily further processed by machine software 24 (or alternatively middleware server 44).

The value of Process returned by the method call may identify successful execution of the method. In response to an error code, virtual machine software 24 may log an error and report that error to the user of device 10 through a standard error message dialog.

As will be apparent, the name of each class 29 is identified in the PROGID variable used as each class is created and will be registered in accordance with COM.

Figure 5:
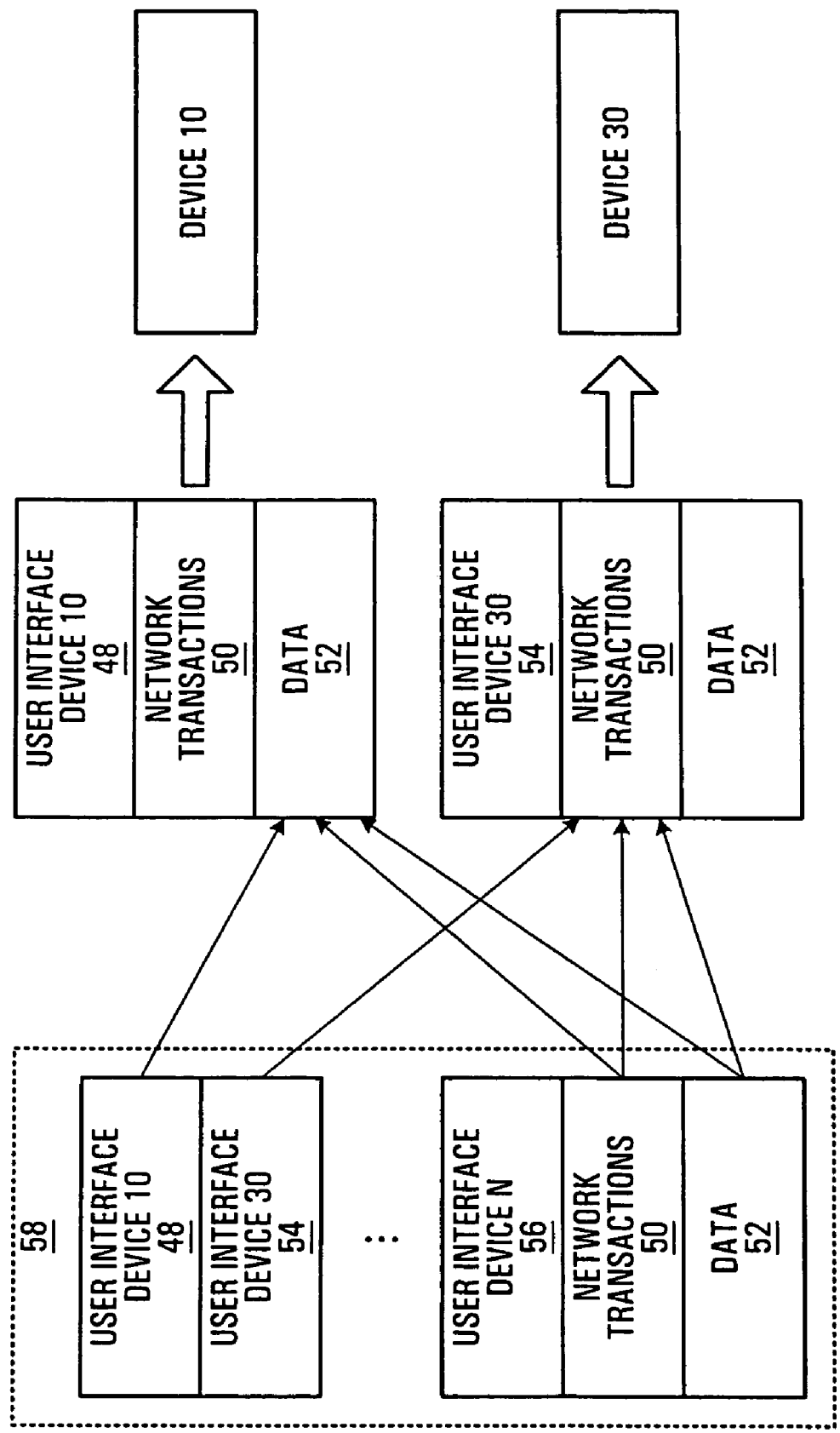
FIG. 5 schematically illustrates the formation of application definition files at a middleware server of FIG. 2.

FIG. 5 illustrates the organization of application definitions at middleware server 44 and how middleware server 44 may form an application definition 28 (FIG. 4) for a given device 10, 30, 32 or 34. In the illustration of FIG. 5, only two mobile devices 10 and 30 are considered. Typically, since network transactions and local data are the same across devices, the only piece of the application definition that varies for different devices is the user interface definition.

So, middleware server 44 stores a master definition 58 for a given server side application. This master definition 58 contains example user interface descriptions 48, 54, 56 for each possible mobile device 10, 30, 32; descriptions of the network transactions 50 that are possible and data descriptions 52 of the data to be stored locally on the mobile device. Preferably, the network transactions 50 and data descriptions 52 will be the same for all mobile devices 10, 30 and 32.

For device 10, middleware server 44 composes an application definition 28 by querying the device type and adding an appropriate user interface description 48 for device 10 to the definitions for the network transactions 50 and the data 52. For device 30, middleware server 44 composes the application definition by adding the user interface description 54 for device 10 to the definitions for the network transactions 50 and data 52.

The master definition 58 for a given application is created away from the middleware server and loaded onto the middleware server by administrative staff charged with its operation. Master definition files could be created either by use of a simple text editor, or by a graphical file generation tool. Such a tool might generate part or all of the file, using knowledge of the XML formatting rules, based on the user's interaction with screen painters, graphical data definition tools and the like.

Figure 6:
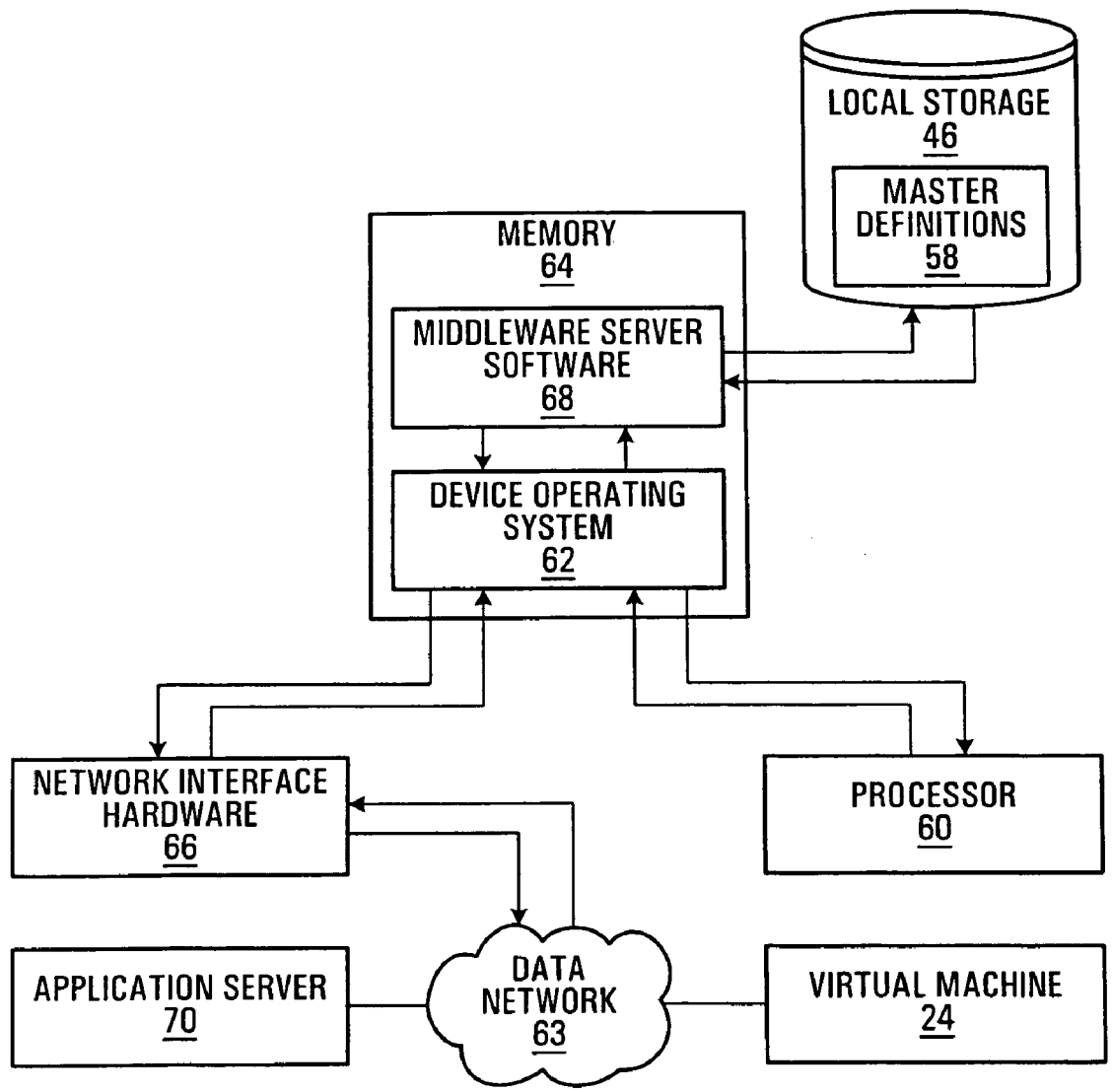
FIG. 6 schematically illustrates the middleware server of FIG. 2, exemplary of an embodiment of the present invention, including an application definitions database, further exemplary of an embodiment of the present invention.

FIG. 6 illustrates the organization of middleware server 44 and associated master definitions. Middleware server 44 may be any conventional application server, modified to function in manners exemplary of the present invention. As such, middleware server 44 includes a processor 60, in communication with a network interface 66 and storage memory 64. Middleware server 44 may be, for example, be a Windows NT server, a Sun Solaris server, or the like. Memory of middleware server 44 stores an operating system such as Windows NT, or Solaris operating system software 62.

Network interface 66 enables middleware server 44 to transmit and receive data over a data network 63. Transmissions are used to communicate with both the virtual machine software 24 (via the wireless networks 36, 38 and wireless gateways 40,42) and one or more application servers, such as application server 70, that are the end recipients of data sent from the mobile client applications and the generators of data that is sent to the mobile client applications.

Memory at middleware server 44 further stores software 68, exemplary of an embodiment of the present invention. Middleware server software 68, when executed by middleware server 44 enables the middleware server to understand and compose XML data packages that are sent and received by the middleware server. These packages may be exchanged between middleware server 44 and the virtual machine software 24, or between the middleware server 44 and the application server 70.

As described above, communication between the application server 70 and the middleware server 44 uses HTTP running on top of a standard TCP/IP stack. An HTTP connection between a running application at the application server 70 and the middleware server 44 is established in response to the application at a mobile device presenting the application. The server side application provides output to middleware server 44 over this connection. The server side application data is formatted into appropriate XML data packages understood by the virtual machine software 24 at a mobile device by the server side application.

That is, a server side application (or an interface portion of the application) formats application output into XML in a manner consistent with the format defined by the application definition file for the application. Alternatively, an interface component separate from the application could easily be formed with an understanding of the format and output for a particular application. That is, with a knowledge of the format of data provided and expected by an application at application server 70, an interface component could be a produced using techniques readily understood by those of ordinary skill. The interface portion could translate application output to XML, as expected by middleware server 44. Similarly, the interface portion may translate XML input from a mobile device into a format understood by the server side application.

The particular identity of the mobile device on which the application is to be presented may be identified by a suitable identifier, in the form of a header contained in the server side application output. This header may be used by middleware server 44 to forward the data to the appropriate mobile device. Alternatively, the identity of the connection could be used to forward the data to the appropriate mobile device.

Figure 7:
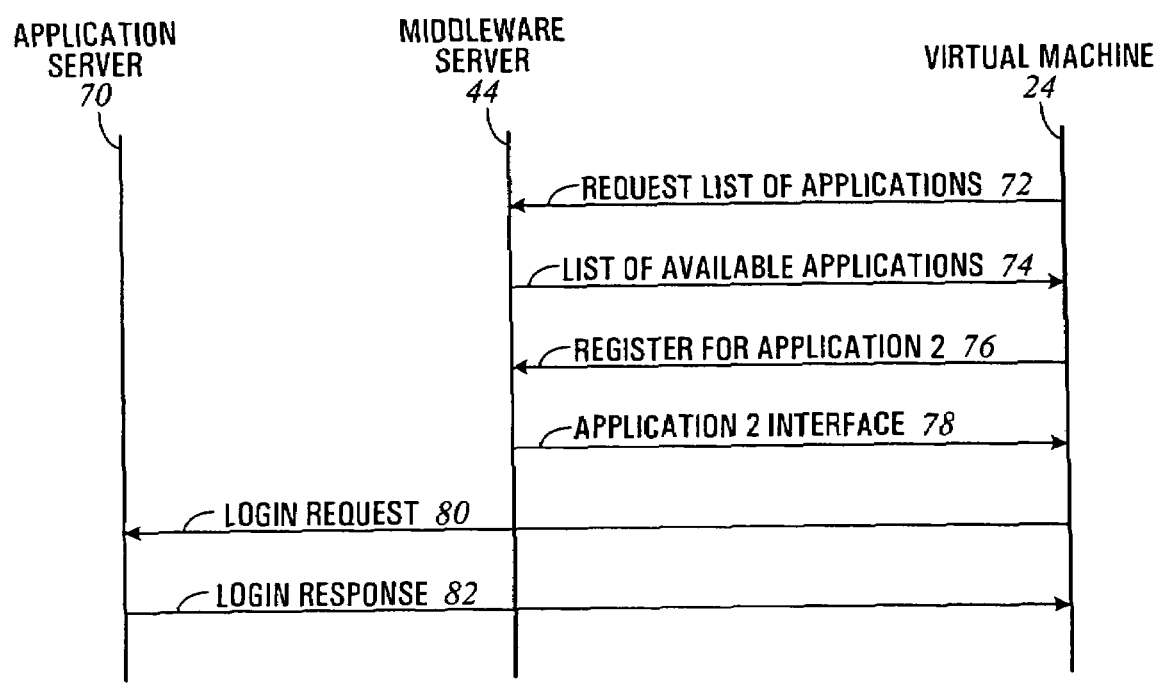
FIG. 7 is a flow diagram illustrating the exchange of sample messages passed between a mobile device, middleware server and application server of FIG. 2.

FIG. 7 illustrates a flow diagram detailing data (application data or application definition files 28) flow between mobile device 10 and middleware server 44, in manners exemplary of an embodiment of the present invention.

For data requested from middleware server 44, device 10, under software control by virtual machine software 24 makes requests to middleware server 44 (also illustrated in FIG. 2), which passes over the wireless network 36 through network gateway 40. Network gateway 40 passes the request to the middleware server 44. Middleware server 44 responds by executing a database query on its database 46 that finds which applications are available to the user and the user's mobile device. For data passed from middleware server 44 to device 10, data is routed through network gateway 40. Network gateway 40 forwards the information to the user's mobile device over the wireless network 36.

FIG. 7 when considered with FIG. 3 illustrates a sequence of communications between device 10, and middleware server 44 that may occur when the user of a mobile device wishes to download an application definition 28 for a server side application.

So, initially, device 10 interrogates server 44 to determine which applications are available for the particular mobile device being used. In response, a user at device 10 may choose to register for an available server side application. Thereafter the middleware server creates the application definition file and sends to the mobile device (data flow 78) the created application definition 28. This all further detailed in US Patent Publication No. US 2003/0060896.

The user is then able to use the functionality defined by the interface description to send and receive data.

At this time, parser 61 of virtual machine software 24 may parse the XML text of the application definition file to form a tokenized version of the file. That is, each XML tag may be converted a defined token for compact storage, and to minimize repeated parsing of the XML text file. The tokenized version of the application definition file may be stored for immediate or later use by device 10.

Thereafter, upon invocation of a particular application for which the device 10 has registered, the screen generation engine 67 of the virtual machine software 24 at the device causes the virtual device to locate the definition of an initial screen for that application. The initial screen is identified within the application definition 28 for that application using a <SCREEN> tag, and an associated attribute of <First screen="yes">.

Figure 8:
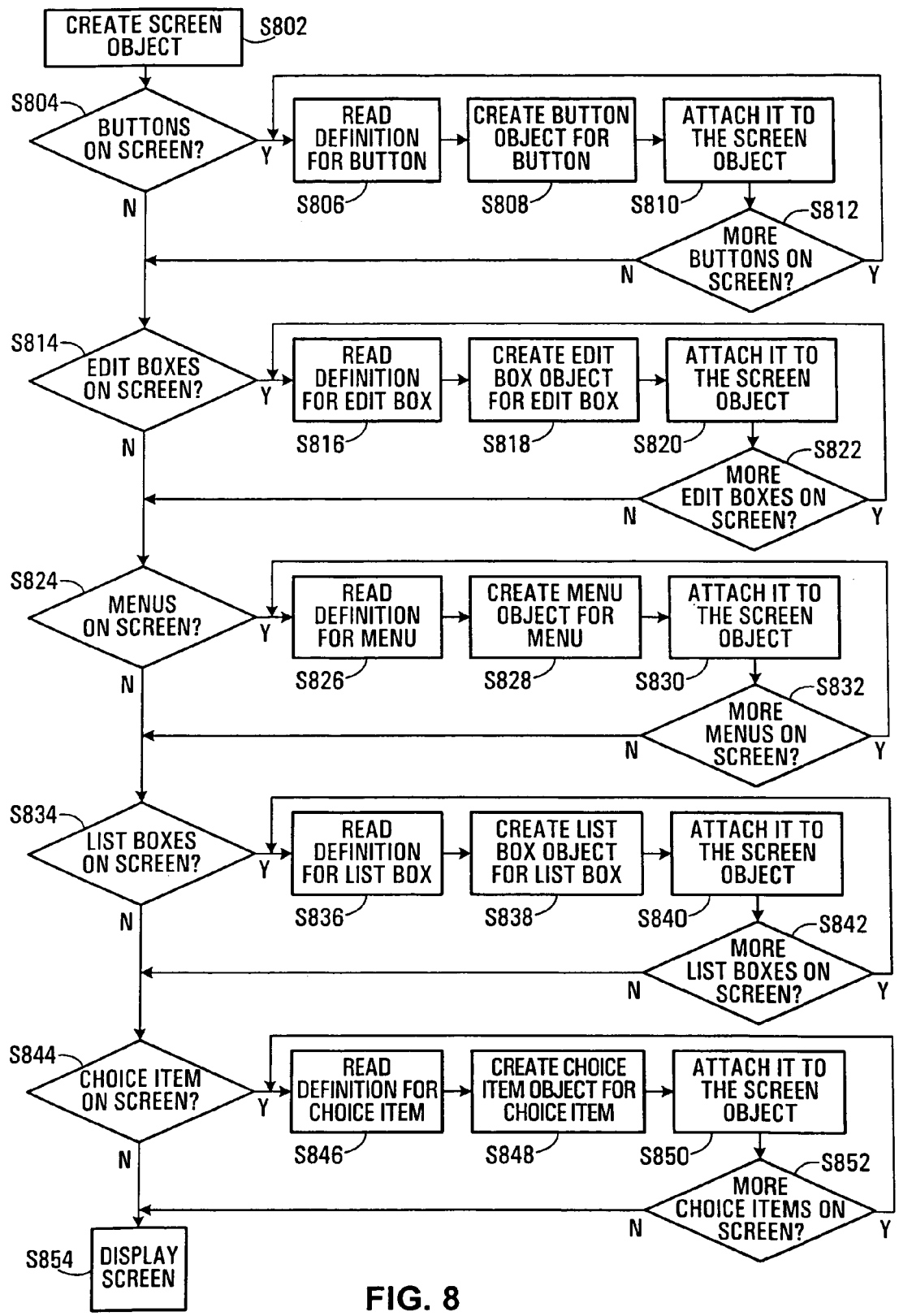
FIGS. 8-11 illustrate steps performed at a mobile device under control of virtual machine software of FIG. 2.

Steps performed by virtual machine software 24 in processing this screen (and any screen) are illustrated in FIG. 8. As illustrated, screen generation engine 67, generates an instance of an object class, defining a screen by parsing the section of the XML application definition file corresponding to the <SCREEN> tag in step S802. Supported screen elements may be buttons, edit boxes, menus, list boxes, and choice items, as identified in sections 5.3, 5.4, and 5.5 of Appendix "A". Other screen elements, such as images and checkboxes, as detailed in Appendix "A" may also be supported. For clarity of illustration, their processing by screen generation engine 67 however, is not detailed. Each supported tag under the SCREEN definition section, in turn causes creation of instances of object classes within the virtual machine software 24. Typically, instances of objects corresponding to the tags, used for creation of a screen, result in presentation of data at mobile device 10. As well the creation of such objects may give rise to events (e.g. user interaction) and actions to be processed at device 10.

Figure 9:
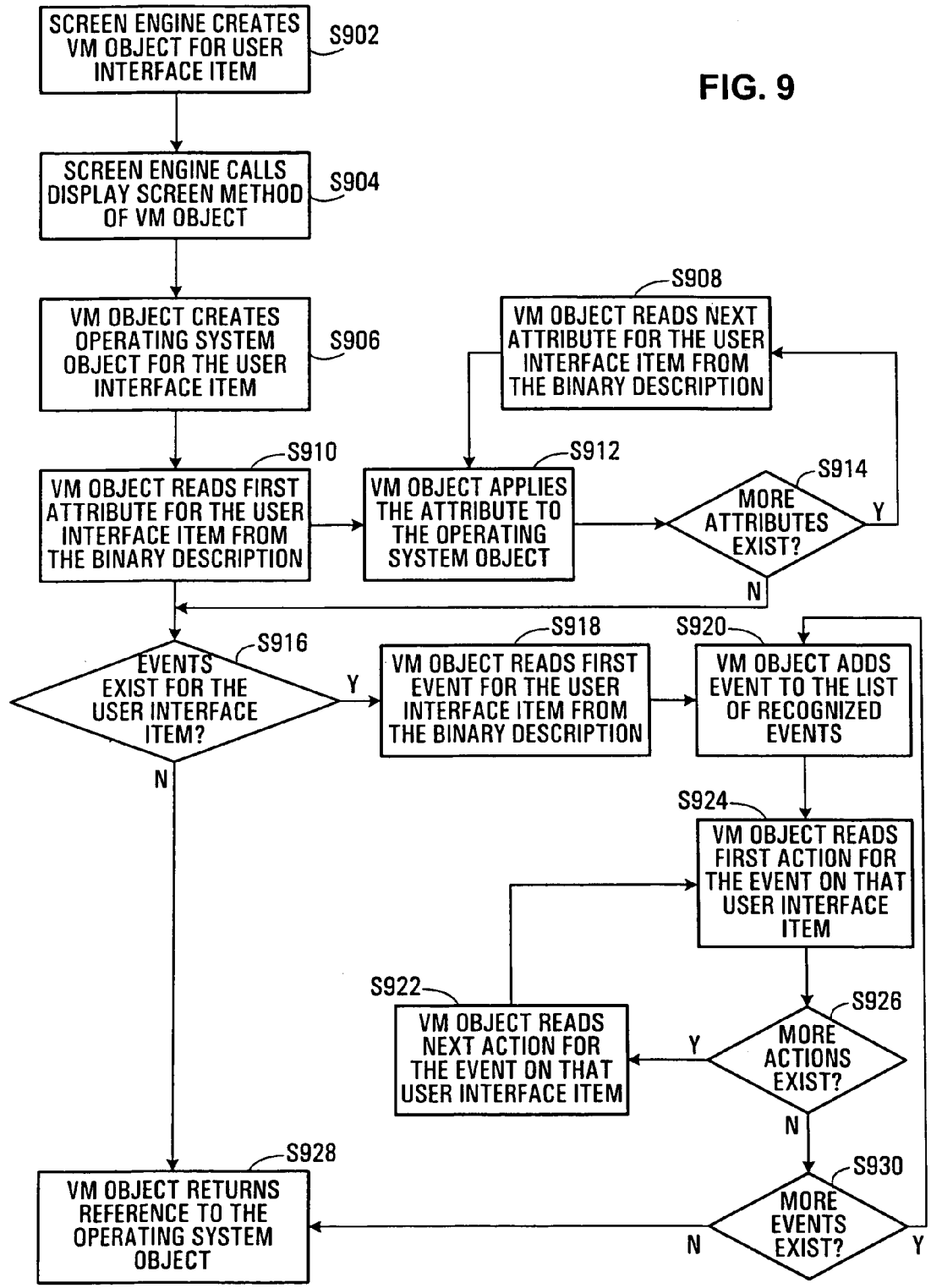

Each element definition causes virtual machine software 24 to use the operating system of the mobile device to create corresponding display element of a graphical user interface as more particularly illustrated in FIG. 9. Specifically, for each element, the associated XML definition is read in step S806, S816, S826, S836, and S846, and a corresponding instance of a screen object defined as part of the virtual machine software 24 is created by the virtual machine software 24 in steps S808, S818, S828, S838 and S848, in accordance with steps S902 and onward illustrated in FIG. 9. Each interface object instance is created in step S902. Each instance takes as attribute values defined by the XML text associated with the element. A method of the virtual object is further called in step S904, and causes a corresponding device operating system object to be created. Those attributes defined in the XML text file, stored within the virtual machine object instance are applied to the corresponding instance of a display object created using the device operating system in steps S908S-S914. These steps are repeated for all attributes of the virtual machine object instance. For any element allowing user interaction, giving rise to an operating system event, the event handler 65 of virtual machine software 24 is registered to process operating system events, as detailed below.

Additionally, for each event (as identified by an <EVENT> tag) and action (as identified by an <ACTION> tag) associated with each XML element, virtual machine software 24 creates an instance of a corresponding event and action object forming part of virtual machine software 24. Virtual machine software 24 further maintains a list identifying each instance of each event and action object, and an associated identifier of an event in steps S916 to S928.

Steps S902-S930 are repeated for each element of the screen in steps S808, S818, S828, S838 and S848 as illustrated in FIG. 8. All elements between the <SCREEN> definition tags are so processed. After the entire screen has been so created in memory, it is displayed in step S854, using conventional techniques.

As will be appreciated, objects specific to the type of device executing the virtual machine software 24. Functions initiated as a result of the XML description may require event handling. This event handling is processed by event handler 65 of virtual machine software 24 in accordance with the application definition 28. Similarly, receipt of data from a mobile network will give rise to events. Event handler 65, associated with a particular application presented at the device similarly processes incoming messages for that particular application. In response to the events, virtual machine software 24 creates instance of software objects, and calls functions of those object instances, as required by the definitions contained within the XML definitions contained within the application definition 28, giving rise to the event.

As noted, the virtual machine software 24 includes object classes, allowing the virtual machine to create object instances corresponding to an <EVENT> tag. The event object classes includes methods specific to the mobile device that allow the device to process each of the defined XML descriptions contained within the application definition file, and also to process program/event flow resulting from the processing of each XML description.

Figure 10:
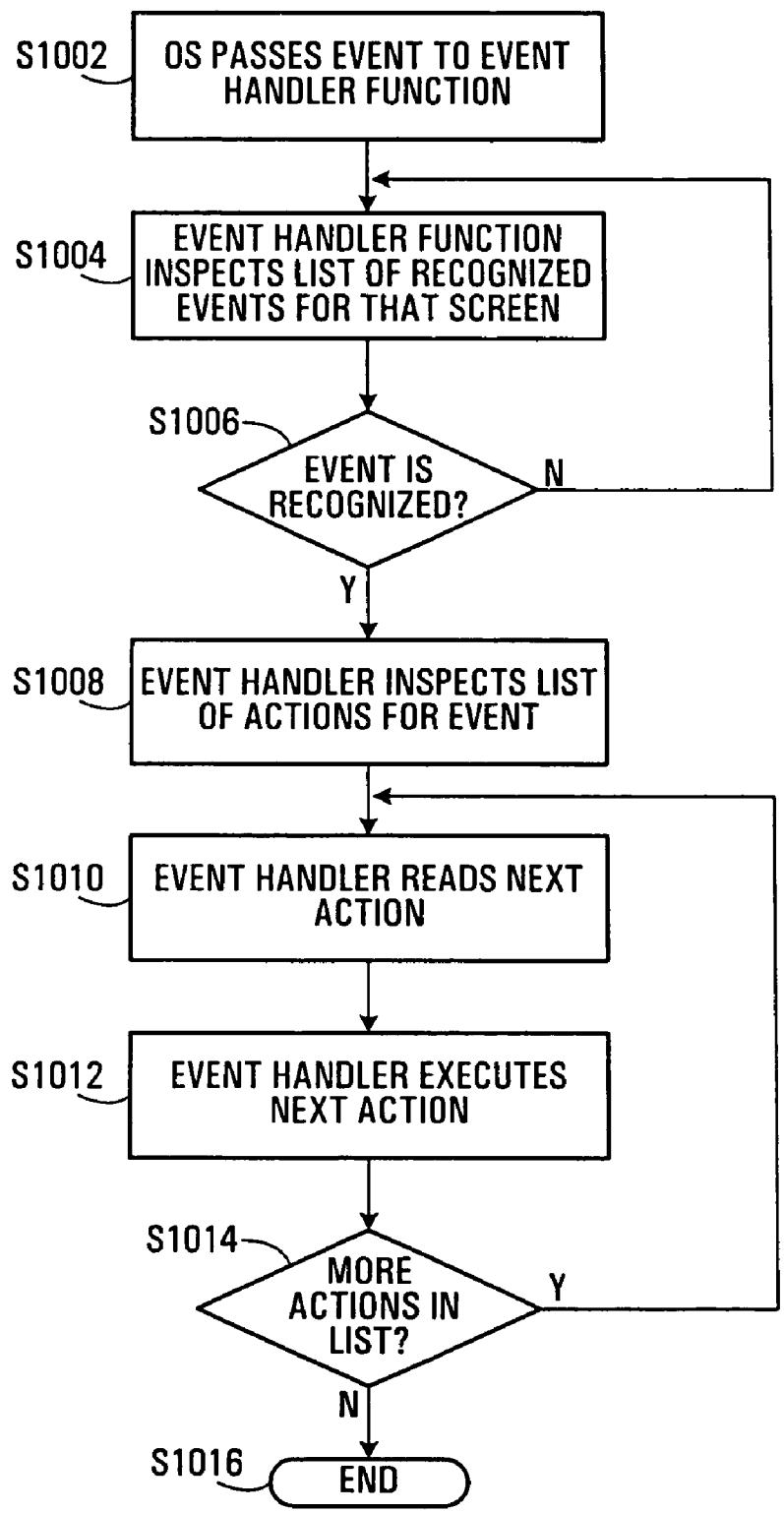

Events may be handled by virtual machine software 24 as illustrated in FIG. 10. Specifically, as device handler 65 has been registered with the operating system for created objects, upon occurrence of an event, steps S1002 and onward are performed in response to the operating system detecting an event.

An identifier of the event is passed to event handler 65 in step S1002. In steps S1004-S1008, this identifier is compared to the known list of events, created as a result of steps S916-S930. For an identified event, actions associated with that event are processed in step S1008-S1014.

That is, virtual machine software 24 performs the action defined as a result of the <ACTION> tag associated with the <EVENT> tag corresponding to the event giving rise to processing by the event handler 65. The <ACTION> may cause creation of a new screen, as defined by a screen tag, a network transmission, a local storage, or the like.

Figure 11:
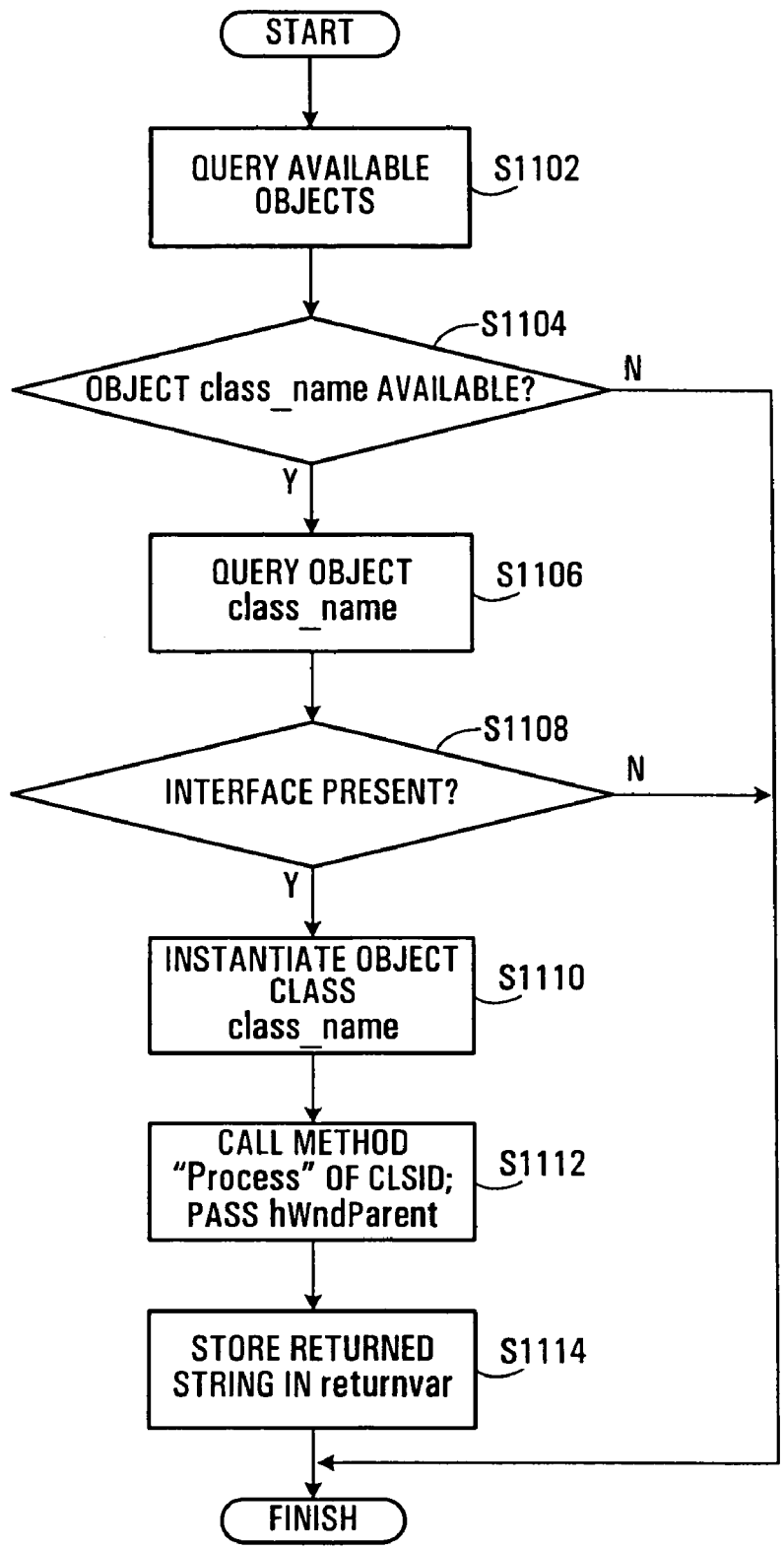

In particular, if the NAME tag associated with the action identifies INTEGRATION tag, virtual machine software 24 performs steps S1100 depicted in FIG. 11, as a result of executing the next action in step S1012. As illustrated, virtual machine software 24 compares the value provided to the CLSID variable to the names of accessible classes not forming part of virtual machine software 24.

In step S1102, virtual machine software 24 queries the list of available accessible object classes. If objects classes 29 were created using COM, as detailed above, this is accomplished by querying the WindowsCE registry. If an object class corresponding to the class identified in the CLID (i.e. CLID=class_name) variable is found as determined in steps S1104, the class is queried in step S1106, to verify that the class indeed extends virtual machine software 24. Querying may be accomplished by querying the class to determine if it provides the interface expected by virtual machine software 24. Specifically, the class may be queried to determine if it has an interface having a chose name or type. The interface may be queried using the COM method QueryInterface( ). In the example the object class is queried to locate an interface having the name IAIRIXIntegrationPoint is used. If the class does not have the interface, the INTEGRATION action is terminated by machine software 24 and an error message could optionally be generated.

If the class has the interface, the class is instantiated in step S1112 and a method having a chosen name (i.e. Process) is executed by virtual machine software 24 in step S1114. Parameters hWndParent and the input and output strings formed (i.e. my input text, returnvar passed to variable SAVENAME) part of the tag and XML element are passed to the method. As noted, the actual function of the method is entirely determined by the author of the class, and not the provider of virtual machine software 24. Upon completion of the executed method, the results of the method are passed to virtual machine software 24, by assigning the result to the variable OutputString. If the SAVE variable is set to true, the results returned by the method are stored in the variable identified assigned to the SAVENAME variable in step S1116. If the identified class does not include the expected interface as determined in step S1110, the INTEGRATION action is terminated. Again, an error message could be generated.

Conveniently, once data returned by the method call is stored locally in a variable defined in application definition 28 and otherwise accessible by virtual machine software 24. Of course, the contents of the variable may be acted upon as otherwise dictated by the application definition 28. Thus, contents of the variable may be presented as part of the user interface, or sent back to middleware server 44, for example as part of a message defined in portion 50 of the application definition 28 as identified by the <DATA> tag, as detailed in Appendix "A".

After execution of the method of the external class 29, additional screens, may be created by invocation of the screen generation engine 67, as detailed in FIGS. 8 and 9. In this manner the navigation through the screens of the application is accomplished according to the definition embodied in the XML application definition.

Similarly, when the user wishes to communicate with the middleware server, or store data locally, event handler 65 creates instances of corresponding object classes within the object classes 69 of virtual machine software 24 and calls their methods to store or transmit the data using the local device operating system. The format of data is defined by the device local definition section 52; the format of network packages is defined in the network transaction package definition section 50.

For example, data that is to be sent to the wireless network is assembled into the correct XML packages using methods within an XML builder object, formed as a result of creating an instance of a corresponding object class within object classes 69 of virtual machine software 24. Methods of the XML builder object create a full XML package before passing the completed XML package to another message server object. The message server object uses the device's network APIs to transmits the assembled data package across the wireless network.

Received XML data packages from network 63 (FIG. 2) give rise to events processed by event handler 65. Processing of the receipt of data packages is not specifically illustrated in FIG. 9. However, the receipt of data triggers a "data" event of the mobile device's operating system. This data event is passed to the virtual machine, and event handler 65 inspects the package received. As long as the data received is a valid XML data package as contained within the application definition, the virtual machine inspects the list of recognised XML entities.

So, for example, a user could send a login request 80 by interacting with an initial login screen, defined in the application definition file for the application. This would be passed by the middleware server 44 to the backend application server 70. The backend application server according to the logic embedded within its application, would return a response, which the middleware server 44 would pass to the virtual machine software 24. Other applications, running on the same or other application servers might involve different interactions, the nature of such interactions being solely dependent on the functionality and logic embedded within the application server 70, and remaining independent of the middleware server 44.

FIG. 12 illustrates sample XML messages passed as the result of message flows illustrated in FIG. 6. For each message, the header portion, between the <HEAD> . . . </HEAD> tags contains a timestamp and the identifier of the sending device.

Example message 72 is sent by the mobile device to request the list of applications that the server has available to that user on that device. It specifies the type of device by a text ID contained between the <PLATFORM> . . . </PLATFORM> tags. Example message 74 is sent in response to message 70 by middleware server 44 to the mobile device 10. It contains a set of <APP> . . . </APP> tag pairs, each of which identifying a single application that is available to the user at device 10. Example message 76 is sent from the mobile device 10 to middleware server 44 to register for a single server side application. The tags specify information about the user. Message 78 is sent by the middleware server 44 to the mobile device in response to a request to register device 10 for an application. The pair of tags <VALUE> . . . </VALUE> gives a code indicating success or failure. In the sample message shown, a success is shown, and is followed by the interface description for the application, contained between the <INTERFACE> . . . </INTERFACE> tags. This interface description may then be stored locally within memory 16 of device 10.

As noted, when a user starts an application that has been downloaded in the manner described above, the virtual machine software 24 reads the interface description that was downloaded for that device 10, and the virtual machine software 24 identifies the screen that should be displayed on startup, and displays its elements as detailed in relation to FIGS. 9 and 10. The user may then use the functionality defined by the user interface definition section 48 of the application definition 28 to send and receive data from a server side application.

For the purposes of illustration, FIG. 13 illustrates the presentation of a user interface for a sample screen on a Windows CE Portable Digital Assistant, that has invoked an externally generated signature capture dialog, as a result of an externally instantiated object. The signature data is stored in a variable LASTSIG, and sent back to application server 44.

An example application definition file 92 (of the format of application definition 28) is illustrated in FIGS. 14, 15 and 16A-16B defines an application entitled SignatureCapture, including a definition of local data in the form of a table titled LASTSIG (FIG. 14), a format of a user interface having a single screen entitled MAIN (FIG. 16A-16B) and the format of network transactions (FIG. 15), corresponding to portions 52, 50 and 52, respectively of an application definition 28.

The screen has four single buttons identified by the 'BTN NAME'="btnCapture", BTN NAME'="btnView", 'BTN NAME'="btnSend", BTN NAME="btnClose".

Upon invocation of this application at the local device, screen generation engine 67 of virtual machine software 24 at the device process the screen definition, as detailed with reference to FIGS. 8 and 9. That is, for each BTN tag, screen generation engine 67 creates a button object instance, in accordance with steps S804-S812. The created buttons will have captions Capture New Signature, View Last Signature, Send to Server, and Close.

Figure 13A:
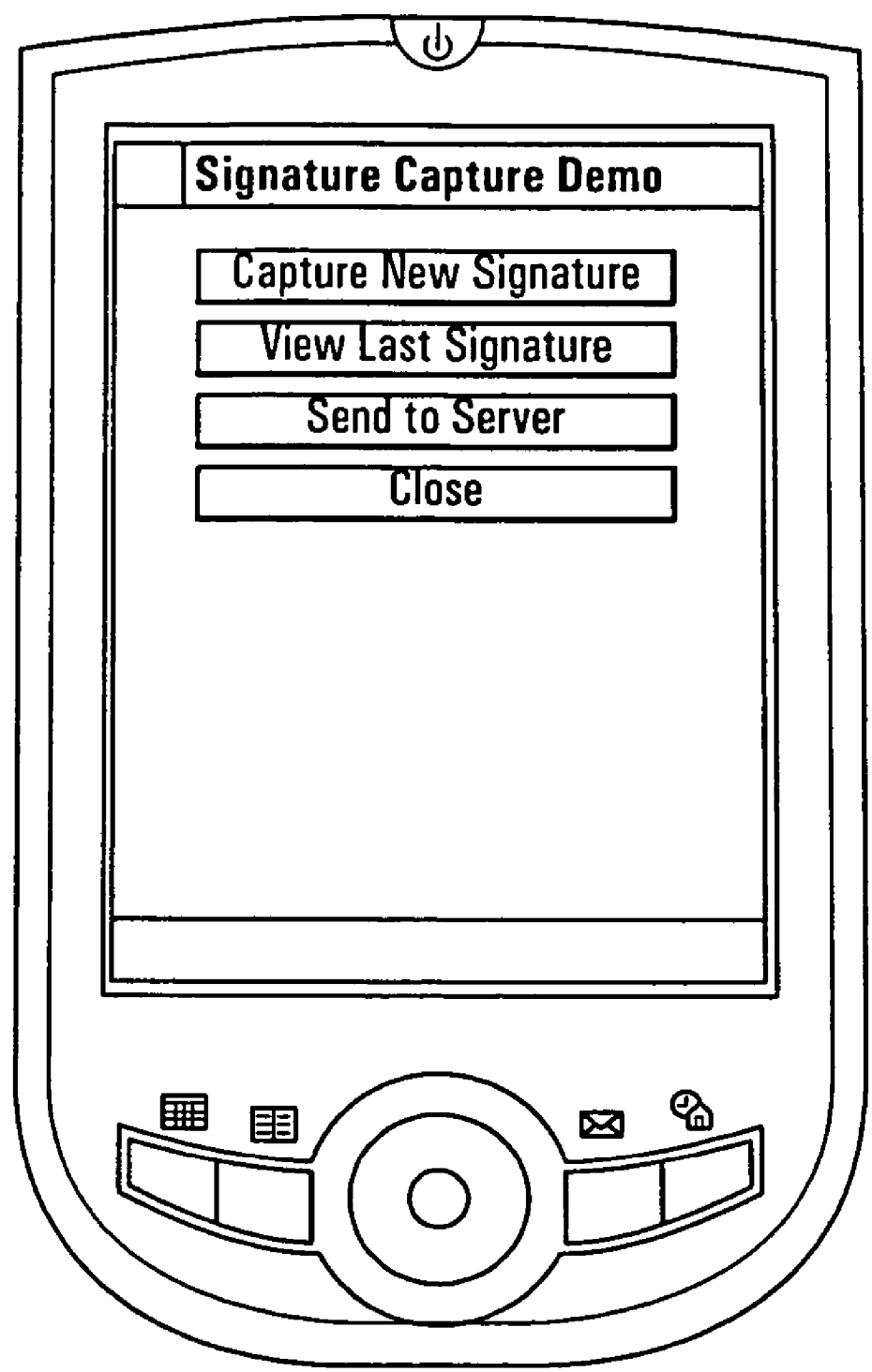
FIGS. 13A and 13B illustrates a presentation of a user interface for a sample application at a mobile device.

The resulting screen at the mobile device is illustrated in FIG. 13A. Each of the screen items is identified with reference to the XML segment within XML definition file 92 giving rise to the screen element.

Call-backs associated with the presented buttons cause graphical user interface application software/operating system software 20 at the mobile device to return control to the event handler 65 of virtual machine software 24 at the device. Thus, as the user interacts with the application, the user may input data within the presented screen using the mobile device API.

Notably, if the button btnSend is pressed, a package of type SIG (as defined in FIG. 15) is sent back to middleware server 44. If btnClose is pressed, the application is closed.

However, if the buttons btnCapture or btnView are captured steps S1100 are performed to instantiate an external object class 29 named AirixSignature.AirixSignatureCtrl, with arguments, SAVENAME="SIGNATURE" SAVE="TRUE" for btnCapture, and SAVENAME="" SAVE="FALSE">[SP.*.SIGNATURE]</ACTION>, for btnView.

An object class 29 named AirixSignature.AirixSignatureCtrl, of course needs to exist, be registered and expose an interface of the forme IAIRIXIntegrationPoint, as detailed above. Its method Process, in turn, causes device 10 to capture a signature or present the signature. These functions may for example be provided using software written for the WindowsCE platform, in a manner appreciated by a person of ordinary skill. In the case of the btnCapture INTEGRATION action, the results of the method return a captured signature, which is stored in variable SIGNATURE by virtual machine software 24. In the case of the btnView the previously captured value stored in the variable SIGNATURE will be passed to the instance of the object class.

Figure 13B:
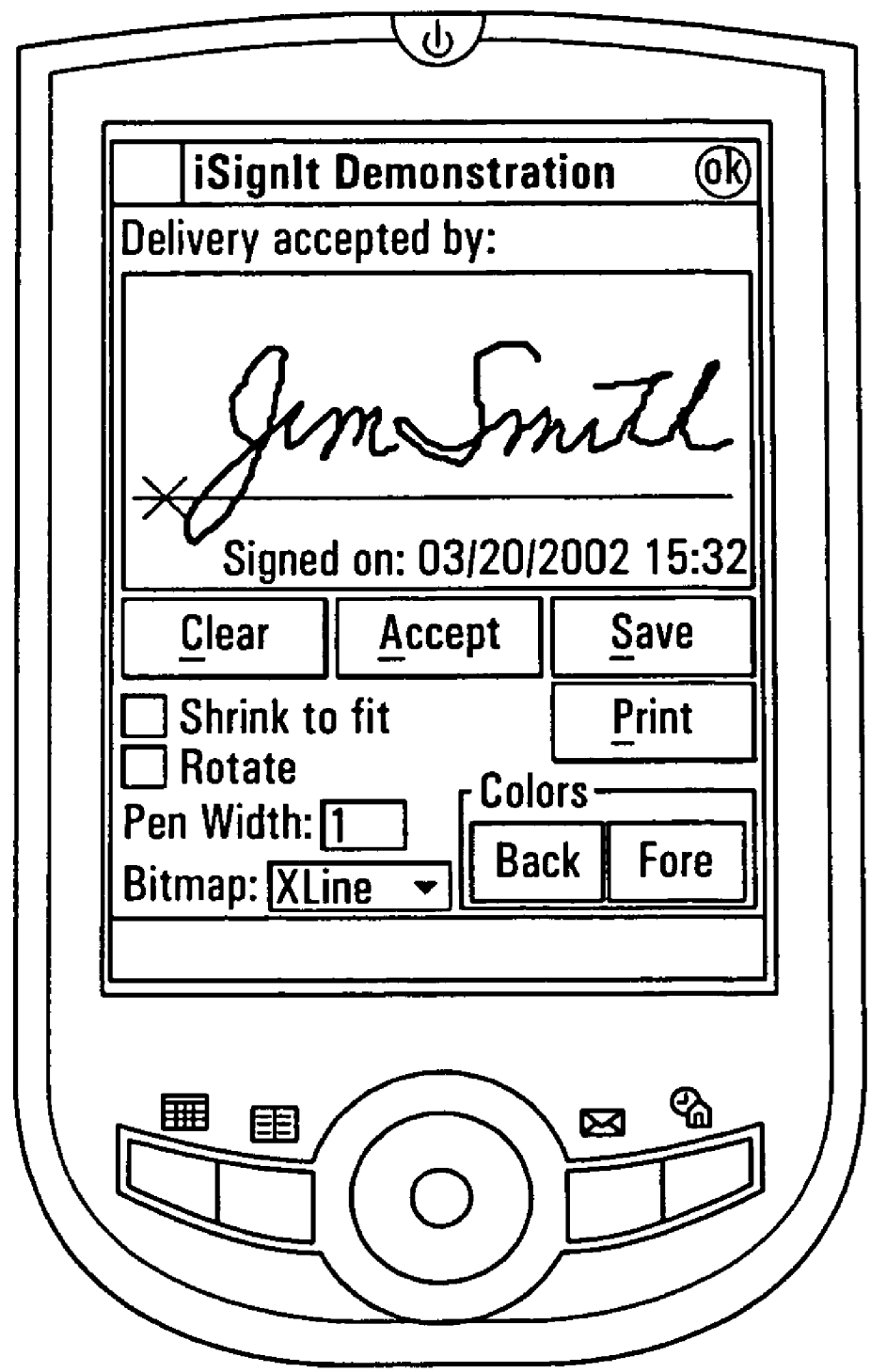

The screen presented at device 10 in response to performing the Process method of the AirixSignature.AirixSignatureCtrl object class is displayed in FIG. 13B.

As can be appreciated from the preceding description and example, use of external software components in the form of object classes 29 allows virtual machine software 24 to be expanded, almost arbitrarily. Conveniently, applications may still be defined using an application definition in a manner relatively abstracted from the underlying device. Conveniently, as local software or hardware functions are added to devices, virtual machine software 24 and applications defined in an application definition 28 may take advantage of the new functionality using external object classes 29.

It will be further understood that the invention is not limited to the embodiments described herein which are merely illustrative of a preferred embodiment of carrying out the invention, and which is susceptible to modification of form, arrangement of parts, steps, details and order of operation. The invention, rather, is intended to encompass all such modification within its scope, as defined by the claims.

What is claimed is:

1. A method of presenting data from an application executing at a computing device at a wireless mobile device remote from said computing device, said method comprising:

receiving at said mobile device, a representation of a text file defining a user interface and actions to be taken in response to user interaction with said user interface or received data from said application;

receiving data from said application;

executing virtual machine software at said mobile device to present said user interface and said received data, in accordance with said text file;

wherein at least one of said actions in said text file specifies execution of a software component separate from said virtual machine software identified in said text file, said software component being in the form of an object class;

querying operating system software executing at said wireless mobile device as to whether said software component identified in said text file is available at said device; and if said querying indicates that said software component is available at said wireless mobile device, executing said software component at said device comprising creating an instance of said object class.

2. The method of claim 1, further comprising querying said software component as to whether said software component includes a pre-determined interface, and wherein said executing is conditional upon determining that said software component includes said pre-determined interface.

3. The method of claim 1, further comprising receiving data from said software component to be used by said virtual machine software.

4. The method of claim 1, wherein said text file identifies said object class by name and wherein said querying comprises querying said operating system software whether an object class having said name exists at said mobile device.

5. The method of claim 1, wherein said text file is received at said wireless mobile device and wherein said text file is an Extensible Markup Language (XML) file.

6. The method of claim 1, wherein said text file is parsed, and a representation of said text file is stored at said wireless mobile device for use by said virtual machine software.

7. The method of claim 1, further comprising storing data generated by said software component at said wireless mobile device in accordance with said text file.

8. The method of claim 1, wherein said format of network messages comprises XML definitions for said network messages, and wherein data for said application are dispatched from said wireless device using said XML definitions.

9. The method of claim 1, wherein said software component facilitates the capture of a signature of a user.

10. The method claim 1, wherein said software component interfaces with peripheral hardware at said device.

11. A wireless mobile device comprising:

a processor;

computer readable memory in communication with said processor, storing operating system software and virtual machine software controlling operation of said wireless mobile device, said virtual machine software comprising:

a parser for receiving a text file;

a screen generation engine, for presenting at least one screen at said wireless mobile device in accordance with said text file;

instructions for querying said operating system software as to whether a software component, which is identified in said text file and is separate from said virtual machine software, is available at said wireless mobile device, said software component being in the form of an object class; and an event handler for processing events arising in response to user interaction with said at least one screen in accordance with said text file, said event handler operable to execute said software component if, upon executing said instructions, it is determined that said software component is available at said wireless mobile device wherein executing said software component comprises creating an instance of said object class.

12. The wireless mobile device of claim 11, wherein said memory further stores a representation of said text file.

13. The wireless mobile device of claim 11, wherein said representation of said text file is created by said parser.

14. The wireless mobile device of claim 11, wherein said parser comprises an Extensible Markup Language (XML) parser.

15. The wireless mobile device of claim 11, wherein said virtual machine software further adapts said processor to parse said text file.

16. The wireless mobile device of claim 15, wherein said virtual machine software further adapts said parser comprises to parse said text file as an XML file.

17. The wireless mobile device of claim 11, wherein said virtual machine software further comprises object classes corresponding to actions to be taken by said device in response to interaction with said at least one screen.

18. The wireless mobile device of claim 11, wherein said memory further stores said software component separate from said virtual machine software.

19. The wireless mobile device of claim 11, wherein said software component separate from said virtual machine software interacts with hardware at said mobile device.

20. The wireless mobile device of claim 11, wherein said software component separate from said virtual machine software receives parameters contained in said text file from said virtual machine software.

21. The wireless mobile device of claim 11, wherein said software component separate from said virtual machine software returns data to said virtual machine software.

22. The wireless mobile device of claim 11, wherein said software component separate from said virtual machine software returns data to said virtual machine software in XML format.

23. Computer readable medium storing software to be executed at a mobile device, adapting said mobile device to perform the method of claim 1.

24. The wireless mobile device of claim 11, wherein said virtual machine software further comprises instructions for querying said at least one object class as to whether said at least one object class provides a pre-determined interface and instructions for instantiating said at least one object class if said querying indicates that said at least one object class does provide said pre-determined interface.

25. A wireless mobile device comprising:

a processor;

computer readable memory in communication with said processor, storing operating system software and virtual machine software controlling operation of said wireless mobile device, said virtual machine software comprising:

a parser for receiving a text file defining a user interface and actions to be taken in response to user interaction with said user interface, one action of said actions specifying execution of a software component separate from said virtual machine software at said wireless mobile device, said text file identifying said software component, said software component being in the form of an object class;

instructions for querying said operating system software as to whether said software component is available at said wireless mobile device;

an instance of said object class instantiated based upon, and corresponding to, said action;

a screen generation engine, for presenting at least one screen at said wireless mobile device in accordance with said text file; and an event handler for processing events arising in response to user interaction with said at least one screen in accordance with said text file, said event handler operable to execute said software component by way of said instance.

* * * * *

UNITED STATES PATENT AND TRADEMARK OFFICE
CERTIFICATE OF CORRECTION

PATENT NO. : 7,533,114 B2  
APPLICATION NO. : 10/537428  
DATED : May 12, 2009  
INVENTOR(S) : Tim Neil, Scott Neil and Andrew Allen Page 1 of 1

It is certified that error appears in the above-identified patent and that said Letters Patent is hereby corrected as shown below:

Column 18  
Claim 16, Line 2: replace "said parser comprises" with -- said parser --

Signed and Sealed this

Fourteenth Day of July, 2009

JOHN DOLL  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,533,114 B2 | Page 1 of 1 |
| APPLICATION NO. | : 10/537428 | |
| DATED | : May 12, 2009 | |
| INVENTOR(S) | : Tim Neil, Scott Neil and Andrew Allen | |

It is certified that error appears in the above-identified patent and that said Letters Patent is hereby corrected as shown below:

Column 18
Claim 16, Line 34: replace "said parser comprises" with -- said parser --

This certificate supersedes the Certificate of Correction issued July 14, 2009.

Signed and Sealed this

Eighteenth Day of August, 2009

David J. Kappos
*Director of the United States Patent and Trademark Office*